United States Patent [19]
Hasegawa et al.

[11] Patent Number: 5,654,780
[45] Date of Patent: Aug. 5, 1997

[54] METHOD OF MANUFACTURING A LIQUID CRYSTAL DISPLAY INCLUDING PERFORMING ORIENTATION RELAXATION TREATMENT ON A PORTION OF THE ORIENTATION FILM.

[75] Inventors: Rei Hasegawa; Kazuyuki Sunohara; Hiroyuki Nagata; Yasushi Mori, all of Yokohama, Japan

[73] Assignee: Kabushiki Kaisha Toshiba, Kawasaki, Japan

[21] Appl. No.: 496,675

[22] Filed: Jun. 29, 1995

[30]  Foreign Application Priority Data

Jun. 30, 1994 [JP] Japan .................. 6-150193
Mar. 20, 1995 [JP] Japan .................. 7-059607

[51] Int. Cl.$^6$ .......................... G02F 1/141; G02F 1/1337
[52] U.S. Cl. .......................... 349/136; 349/124
[58] Field of Search ................ 359/75, 76; 349/124, 349/134, 136

[56]  References Cited

U.S. PATENT DOCUMENTS

| | | | |
|---|---|---|---|
| 5,148,300 | 9/1992 | Mizushima et al. | 359/76 |
| 5,280,375 | 1/1994 | Tsuda et al. | 359/76 |
| 5,389,698 | 2/1995 | Chigrinov et al. | 359/75 |
| 5,464,669 | 11/1995 | Krang et al. | 428/1 |
| 5,473,455 | 12/1995 | Koike et al. | 359/78 |

FOREIGN PATENT DOCUMENTS

| | | |
|---|---|---|
| 5-5886 | 1/1993 | Japan . |
| 5-210099 | 8/1993 | Japan . |
| 6-281937 | 10/1994 | Japan . |
| 7-92468 | 4/1995 | Japan . |

Primary Examiner—William L. Sikes
Assistant Examiner—Charles Miller
Attorney, Agent, or Firm—Oblon, Spivak, McClelland, Maier & Neustadt, P.C.

[57]  ABSTRACT

This invention provides a method of manufacturing a liquid crystal display, including the steps of forming an orientation film on a major surface of each of first and second substrates, performing an orientation treatment for the orientation films, performing an orientation relaxation treatment for a portion of the orientation film of each of the first and second substrates, thereby forming a first region and a second region whose orientation degree is smaller than the orientation degree of the first region, arranging the first and second substrates so that the first and second regions of the first substrate and the second and first regions of the second substrate oppose each other, respectively, and that a liquid crystal material has a splay deformation, and injecting the liquid crystal material between the first and second substrates thus arranged to oppose each other.

11 Claims, 8 Drawing Sheets

NO VOLTAGE APPLIED

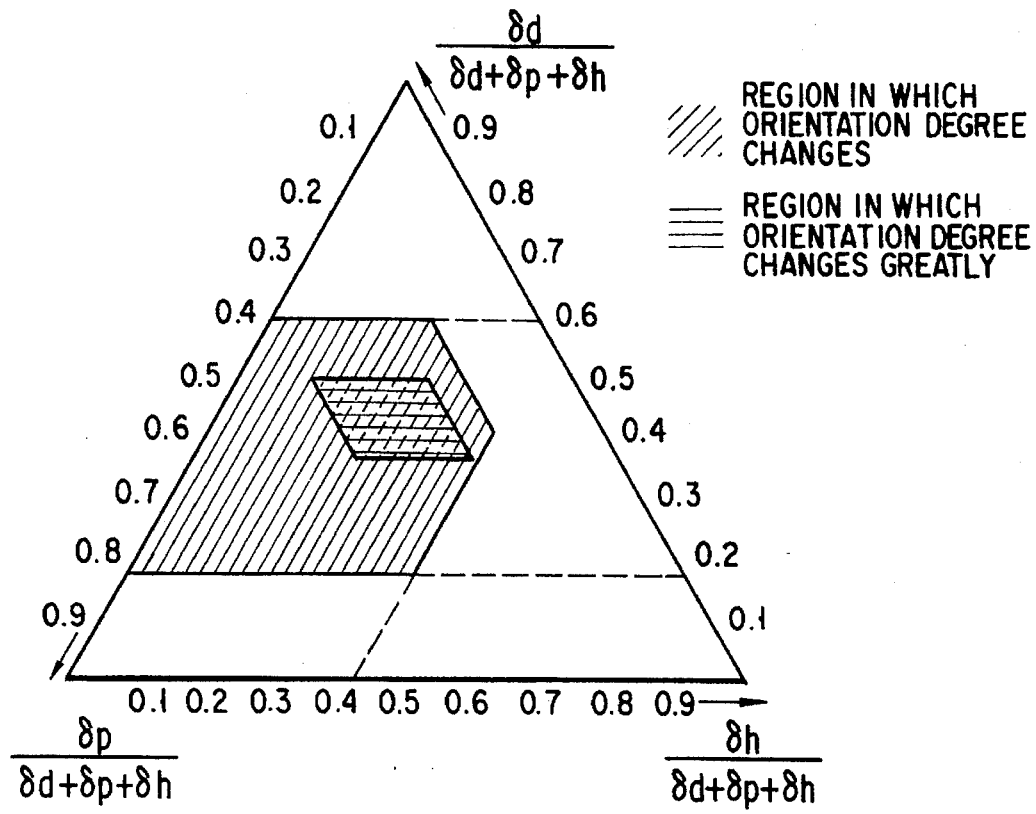
FIG. 3
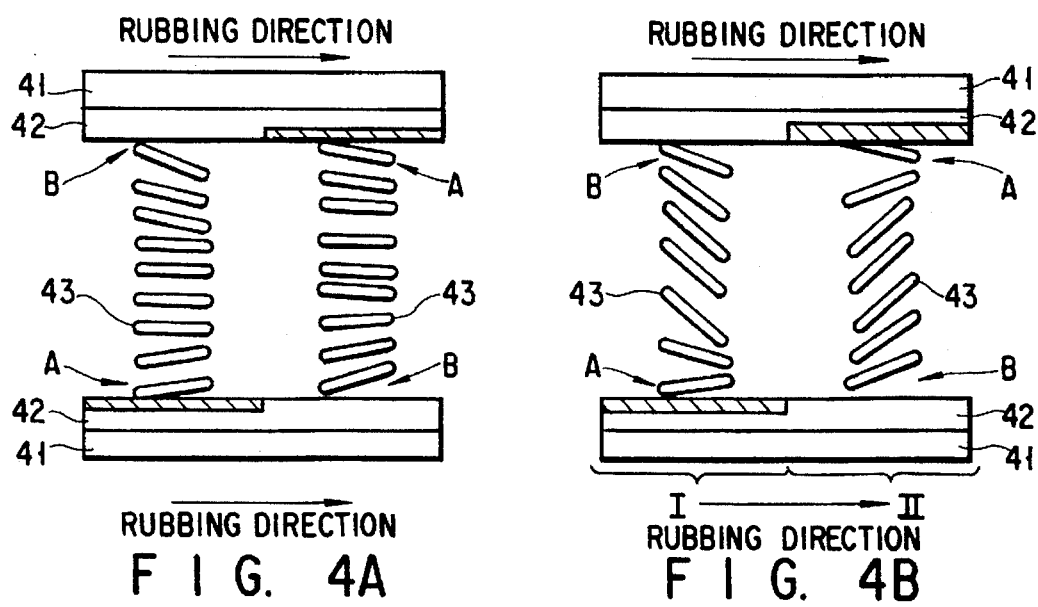
FIG. 4A — NO VOLTAGE APPLIED
FIG. 4B — HALFTONE DISPLAY STAGE
▨ : REGION IN WHICH ORIENTATION DEGREE WAS DECREASED BY CONTACT WITH ORGANIC SOLVENT

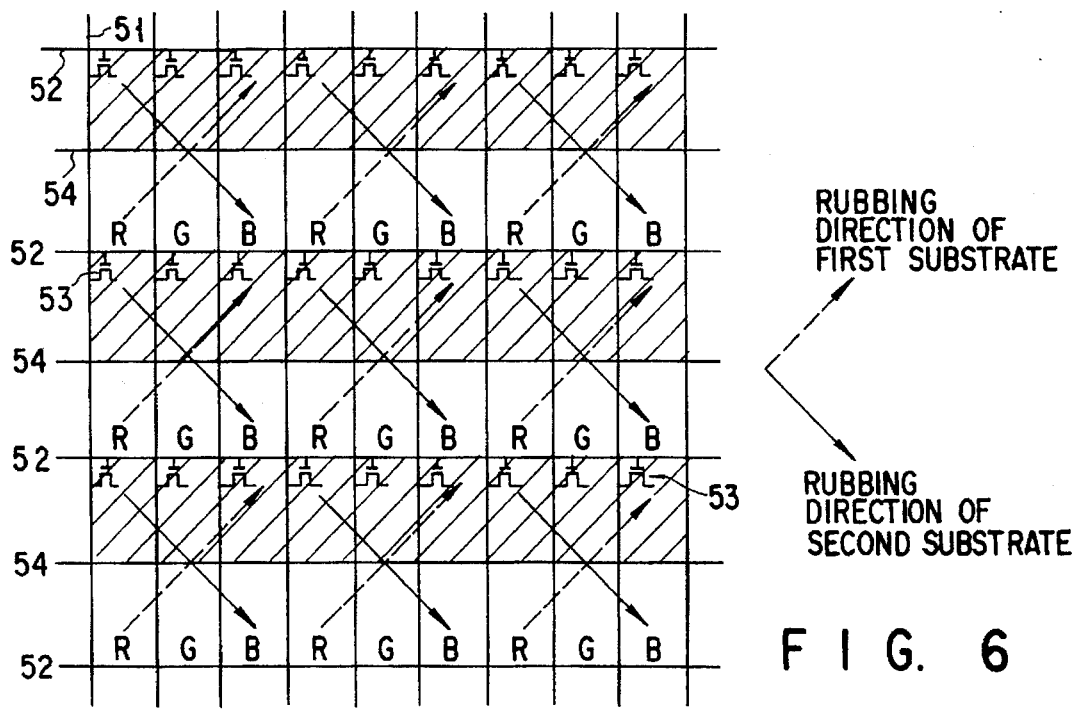

FIG. 6

HATCHED PORTION: REGION IN WHICH ORGANIC SOLVENT WAS BROUGHT INTO CONTACT WITH ORIENTATION FILM OF FIRST SUBSTRATE

UNHATCHED PORTION: REGION IN WHICH ORGANIC SOLVENT WAS BROUGHT INTO CONTACT WITH ORIENTATION FILM OF SECOND SUBSTRATE

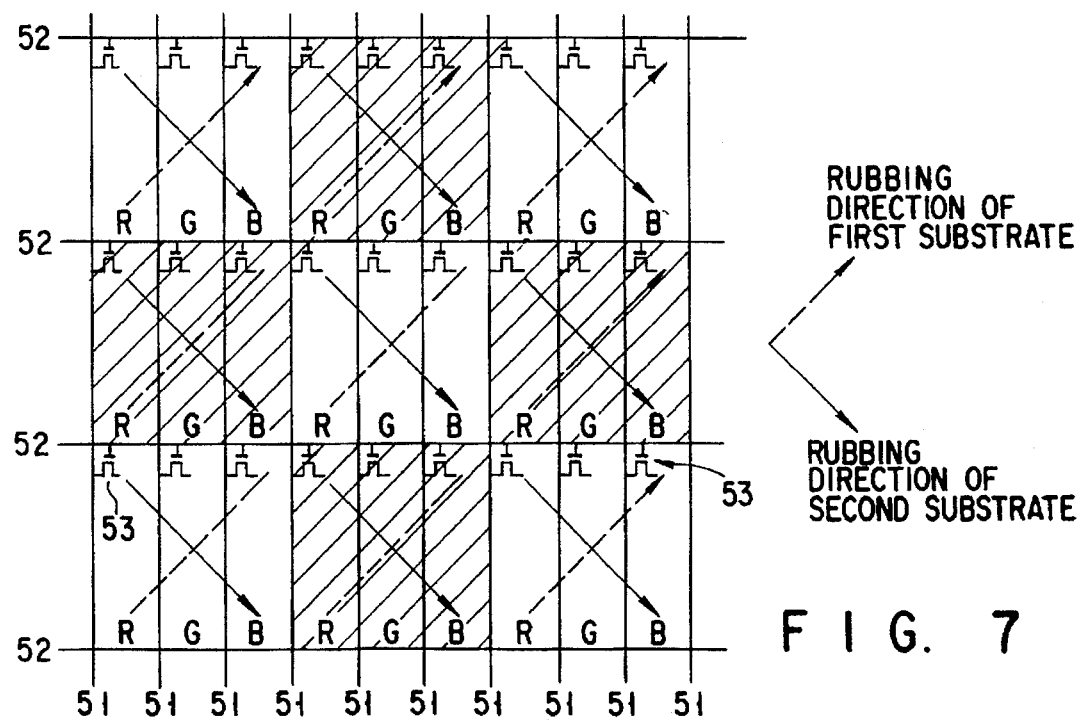

FIG. 7

HATCHED PORTION: REGION IN WHICH ORGANIC SOLVENT WAS BROUGHT INTO CONTACT WITH ORIENTATION FILM OF FIRST SUBSTRATE

UNHATCHED PORTION: REGION IN WHICH ORGANIC SOLVENT WAS BROUGHT INTO CONTACT WITH ORIENTATION FILM OF SECOND SUBSTRATE

| | |
|---|---|
| HATCHED PORTION : | REGION IN WHICH ORGANIC SOLVENT WAS BROUGHT INTO CONTACT WITH ORIENTATION FILM OF FIRST SUBSTRATE |
| UNHATCHED PORTION : | REGION IN WHICH ORGANIC SOLVENT WAS BROUGHT INTO CONTACT WITH ORIENTATION FILM OF SECOND SUBSTRATE |

NO VOLTAGE APPLIED

HALFTONE DISPLAY STAGE

▨ : REGION IN WHICH ORIENTATION DEGREE WAS DECREASED BY CONTACT WITH ORGANIC SOLVENT

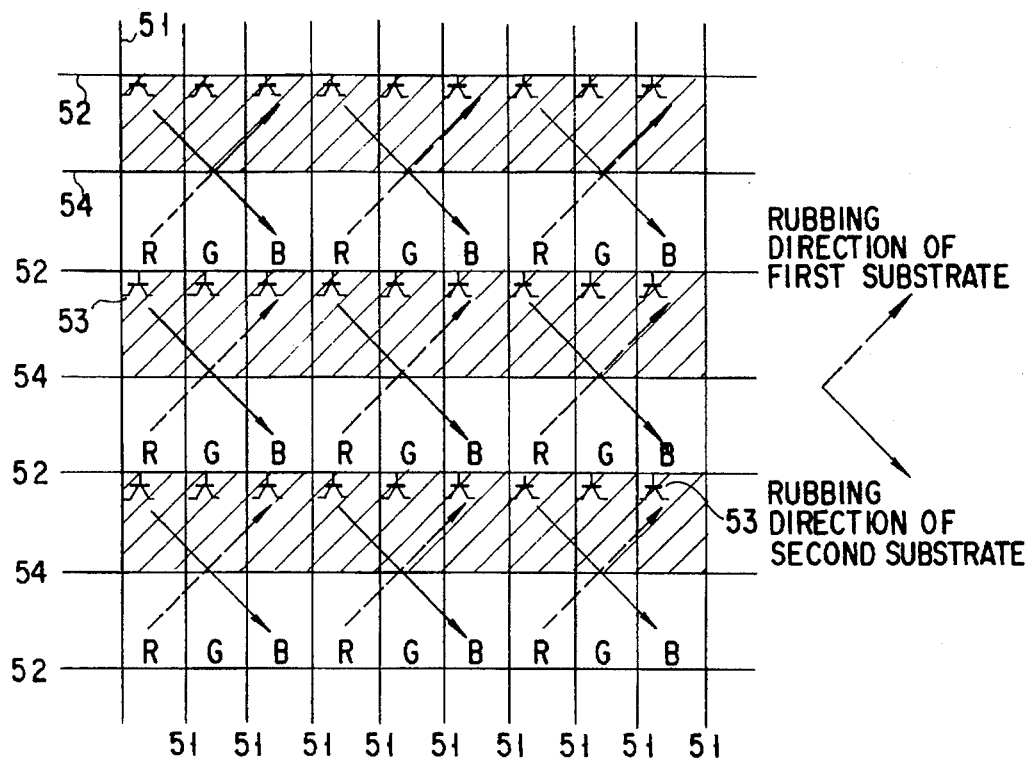
HATCHED PORTION : REGION IN WHICH ORGANIC SOLVENT WAS BROUGHT INTO CONTACT WITH ORIENTATION FILM OF FIRST SUBSTRATE
F I G. 10
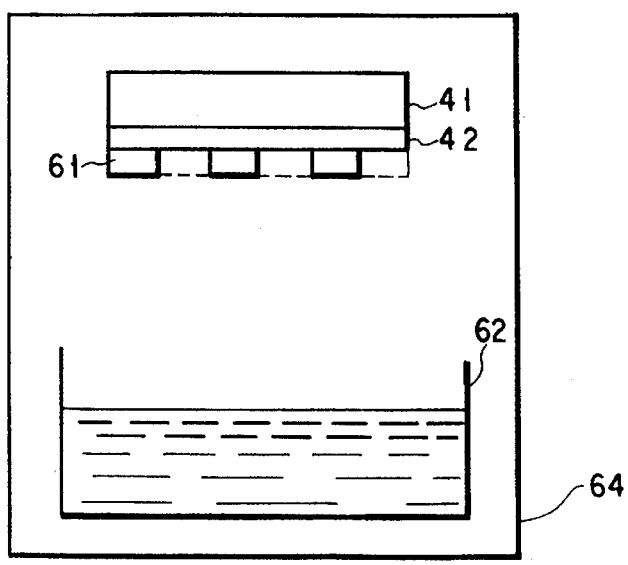
F I G. 11

METHOD OF MANUFACTURING A LIQUID CRYSTAL DISPLAY INCLUDING PERFORMING ORIENTATION RELAXATION TREATMENT ON A PORTION OF THE ORIENTATION FILM.

BACKGROUND OF THE INVENTION

1. Field of the Invention

The present invention relates to a liquid crystal display and a method of manufacturing the same and, more particularly, to a liquid crystal display with a wide view angle and a method of manufacturing the same.

2. Description of the Related Art

Liquid crystal displays are widely used as displays of, e.g., wrist watches and pocket calculators because they are thin and capable of being driven at low voltages. Among other liquid crystal displays, TN liquid crystal displays incorporating active switching devices such as TFTs (thin film transistors) achieve display characteristics comparable to those of CRTs, and STN liquid crystal displays are capable of high-duty multiplex driving. Therefore, both types of liquid crystal displays are beginning to be used as displays of wordprocessors and personal computers and as television displays.

Unfortunately, a TN liquid crystal display has the drawbacks of a narrow view angle and a low light utilization efficiency. The view angle characteristics of a TN liquid crystal display are determined by the liquid crystal molecule rise direction upon application of a voltage. More specifically, in oblique observation of the TN liquid crystal display, the voltage-transmittance characteristics in the liquid crystal molecule rise direction while observing the screen in the longer axis of the liquid crystal molecule are different from those while observing the screen in the shorter axis of the liquid crystal molecule. The contrast of the TN liquid crystal display depends on the view angle accordingly, and the view angle of the TN liquid crystal display is narrower than that of a CRT. For example, when the TN liquid crystal display is obliquely observed downward, the screen looks whitish as a whole. When the TN liquid crystal display is obliquely observed upward, the screen looks blackish as a whole. In either case, the contrast is lowered in oblique observation. In a halftone display, when the screen is obliquely observed upward, color reversal (gradation reversal) occurs. For example, when a portrait is displayed and obliquely observed upward, the skin looks blackish while the black hair looks whitish. The white and black components are reversed. Judging from these points, in evaluation of the view angle of a liquid crystal display, the range of view angles can be numerically expressed within an angle corresponding to a contrast of 5:1 or more or an angle not subjected to the gradation reversal.

To obtain a wide view angle, it is currently being attempted to compensate for different view angles in the plane of surface by making the rise directions of these liquid crystal molecules different in each pixel. Various methods are possible as the method of changing the liquid molecule rise direction in a pixel. As an example, a first rubbing orientation treatment is performed for an entire orientation film, a photoresist is coated on the orientation film, and the resultant orientation film is exposed and developed so that the resist remains only in a half region of each pixel.

Consequently, the orientation film in one half region of each pixel is masked by the photoresist, and the orientation film in the other half region of the pixel is exposed. A second rubbing orientation treatment is performed on this exposed orientation film in a direction different by 180° from the direction of the first rubbing orientation treatment. Thereafter, the photoresist formed in the half region of each pixel is stripped. As a result, two regions having rubbing directions different by 180° are formed in each pixel.

Two substrates in each of which two regions having rubbing directions different by 180° are formed in each pixel are arranged to oppose each other, thereby assembling a liquid crystal cell. The rise direction of liquid crystal molecules upon application of a voltage is determined by the rubbing direction. Therefore, the liquid crystal molecule rise direction in one half region of each pixel differs by 180° from that in the other half region of the pixel. Since the view angle characteristics (the contrast and the color reversal) in these two regions compensate for each other, the view angle of the liquid crystal display is widened.

It is unfortunate that the manufacturing steps of this method are complicated because it is necessary to additionally perform a resist coating step, a prebaking step, an exposure/development step, a rinsing step, a rubbing orientation treatment step (second time), a cleaning step, a resist stripping step, and another rinsing step. Also, there are additional problems that the orientation film subjected to the rubbing orientation treatment is deteriorated by the developer and the stripping agent in the subsequent development and resist stripping steps, and that the resist is scraped off when the second rubbing orientation treatment is performed by using the resist as a mask.

As another method of changing the rise direction of liquid crystal molecules in a pixel, it is being attempted to change the liquid crystal molecule rise direction in a pixel by irradiating ultraviolet radiation to a half region of each pixel in an orientation film, thereby locally changing the polarity on the surface of the orientation film (Jap. Pat. Appln. KOKAI publication 5-210099). In this method, the portion irradiated with ultraviolet radiation is oxidized since in this portion the molecular chain of the polyimide as the material of the orientation film is cleaved and an oxygen atom is added to this broken portion. This raises the polarity on the surface of the orientation film, making the surface hydrophilic. As a consequence, the affinity of this portion for the liquid crystal material is improved, and the pre-tilt angle in this portion decreases accordingly.

A pair of substrates having these orientation films are so arranged that the region (in which the pre-tilt angle is small) irradiated with ultraviolet radiation and the region (in which the pre-tilt angle is large) not irradiated oppose each other, and a liquid crystal material is injected between these substrates, thereby manufacturing a liquid crystal display (Jap. Pat. Appln. KOKAI publication 6-281937). In this liquid crystal display, upon application of a voltage the liquid crystal molecules are strongly affected by the region (not irradiated with ultraviolet radiation) in which the pre-tilt angle is large and rise in a direction 180° away from the pre-tilt direction in the region (irradiated with ultraviolet radiation) in which the pre-tilt angle is small. That is, the liquid crystal molecules are aligned in the pre-tilt direction in the region having a large pre-tilt angle. The result is that two regions in which the liquid crystal molecule rise directions are different by 180° are formed in one pixel. Since the view angle characteristics in these two regions compensate for each other, the view angle of the liquid crystal display is widened.

In this method, however, the region irradiated with ultraviolet radiation and the unirradiated region are different in the properties (the polarity, the hydrophilic nature, the charging properties, the dielectric constant, and the thickness) of the orientation film. Therefore, when the liquid crystal display is AC-driven, a charge, particularly, a negative charge is build up in the orientation film irradiated with ultraviolet radiation, with the result that the absolute values of the voltages on the positive and negative sides applied to the liquid crystal molecules become not equal to each other. Consequently, the liquid crystal display shows a defective display such as flicker or image sticking.

SUMMARY OF THE INVENTION

The present invention has been made in consideration of the above situation and has as its object to provide a liquid crystal display which has a wide view angle and does not show a defective display (flicker or image sticking) caused by a change in the properties of an orientation film, and a method of manufacturing this liquid crystal display with a high efficiency.

The present invention provides a liquid crystal display comprising: first and second substrates each having an orientation film on one major surface; and a liquid crystal material sandwiched between the first and second substrates so arranged that the orientation films oppose each other, wherein the orientation film of the first substrate is divided into a first region and a second region whose orientation degree is smaller than an orientation degree of the first region, and the liquid crystal material is arranged between the first and second substrates so as to have a splay deformation.

In the liquid crystal display of the present invention, the orientation film of the second substrate is divided into a first region and a second region whose orientation degree is smaller than an orientation degree of the first region. The first and second substrates are preferably so arranged that the first and second regions of the first substrate and the second and first regions of the second substrate oppose each other, respectively.

Also, in the liquid crystal display of the present invention, the orientation degree of the orientation film of the second substrate is preferably smaller than the orientation degree of the first region of the first substrate and larger than the orientation degree of the second region of the first substrate.

Additionally, the present invention provides a method of manufacturing a liquid crystal display, comprising the steps of: forming an orientation film on a major surface of each of first and second substrates; performing an orientation treatment for the orientation films; performing an orientation relaxation treatment for a portion of the orientation film of each of the first and second substrates, thereby forming a first region and a second region whose orientation degree is smaller than an orientation degree of the first region; arranging the first and second substrates so that the first and second regions of the first substrate and the second and first regions of the second substrate oppose each other, respectively, and that a liquid crystal material has a splay deformation; and injecting the liquid crystal material between the first and second substrates thus arranged to oppose each other.

Furthermore, the present invention provides a method of manufacturing a liquid crystal display, comprising the steps of: forming an orientation film on a major surface of a first substrate and performing an orientation treatment for the orientation film; forming an orientation film on a major surface of a second substrate and performing an orientation treatment for the orientation film of the second substrate, so that the orientation film has an orientation degree smaller than the orientation film of the first substrate; performing an orientation relaxation treatment for a portion of the orientation film of the first substrate, thereby forming a first region and a second region whose orientation degree is smaller than both of an orientation degree of the first region and the orientation degree of the second substrate; arranging the first and second substrates so that a liquid crystal material has a splay deformation; and injecting the liquid crystal material between the first and second substrates thus arranged to oppose each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a view of the characteristics for explaining a three-dimensional solubility parameter in the present invention;

FIGS. 4A and 9A are views for explaining the liquid crystal display of the present invention when no voltage is applied;

FIGS. 4B and 9B are views for explaining the liquid crystal display of the present invention when a voltage is applied (in a halftone display state);

FIGS. 6 to 8 and 10, are views for explaining embodiments of the liquid crystal display of the present invention; and FIG. 11 is a view for explaining a method of manufacturing the liquid crystal display of the present invention.

DETAILED DESCRIPTION OF THE PREFERRED EMBODIMENTS

Figure 1:
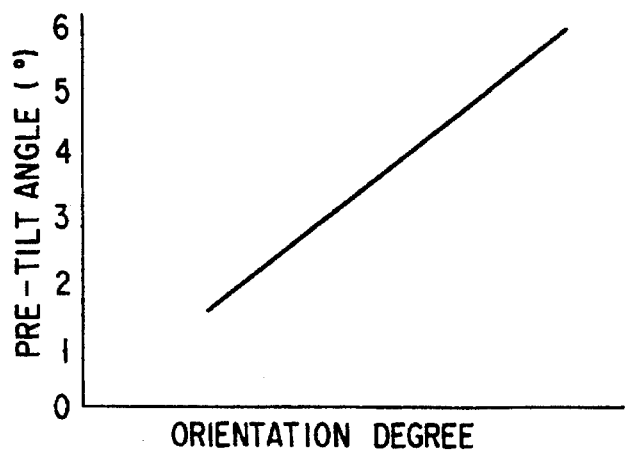
FIG. 1 is a graph showing the relationship between the pre-tilt angle and the orientation degree in the present invention.

The present inventors have made extensive studies on the effect which an organic solvent has upon an orientation film, and found that an organic solvent of a certain kind decreases the orientation degree of an orientation film. It is also found, as shown in FIG. 1, that the pre-tilt angle of liquid crystal molecules decreases in accordance with the decrease in the orientation degree. On the basis of these facts, therefore, the present inventors have realized the present invention in which the view angle of a liquid crystal display is widened by changing the rise direction of liquid crystal molecules upon application of a voltage by a local decrease in the pre-tilt angle of the liquid crystal molecules, which is accomplished by decreasing the orientation degree of an orientation film by bringing an organic solvent of a certain kind into partial contact with the orientation film.

A liquid crystal display of the present invention is characterized in that an orientation film of each of a pair of opposing substrates is divided into a first region and a second region whose orientation degree is smaller than the orientation degree of the first region, the pair of substrates are so arranged that the first and second regions oppose each other, and the liquid crystal material has a splay deformation.

In this arrangement, two regions different in the liquid crystal molecule rise direction are present in each pixel, in every other pixel, or in every few pixels in the orientation film. These two regions compensate for the respective view angle characteristics. As a result, the liquid crystal display acquires a wide view angle.

A method of manufacturing the liquid crystal display of the present invention is characterized by performing an orientation relaxation treatment in a portion of an orientation film, thereby forming a first region and a second region whose orientation degree is smaller than the orientation degree of the first region in each pixel.

This orientation relaxation treatment can be done by a simple step such as bringing a portion (e.g., a half region of each pixel) of an orientation film subjected to an orientation treatment into contact with an appropriate organic solvent. Consequently, it is readily possible to obtain a liquid crystal display with a wide view angle. Also, since in the method of the present invention the two regions having different orientation degrees are formed by the orientation relaxation treatment, an orientation treatment, i.e., a rubbing treatment need only be performed once. This greatly simplifies the manufacturing steps of the method of the present invention.

Additionally, in the liquid crystal display manufacturing method of the present invention, the use of an organic solvent in the gas state allows easy patterning of the first and second regions with no organic solvent penetrating between a mask and an orientation film.

Note that in the present invention, the orientation degree alone is decreased by bringing an orientation film into contact with an appropriate organic solvent; that is, the film properties (e.g., the polarity, the charging properties, the dielectric constant, and the thickness) except for the orientation degree remain unchanged. Therefore, the liquid crystal display does not show any defective display such as flicker or image sticking.

In the present invention, a glass substrate or a plastic substrate, for example, can be used as the substrate. Examples of the orientation film material are polyimides and benzocyclobutene polymers. As the liquid crystal material, it is possible to use a nematic liquid crystal material such as ZLI-3946 (tradename: manufactured by Merck & Co., Inc.)

In the present invention, an orientation film is divided into a first region and a second region whose orientation degree is smaller than the orientation degree in the first region. The magnitude of the orientation degree corresponds to that of the pre-tilt angle. That is, a liquid crystal molecule in contact with a region having a large orientation degree has a relatively large pre-tilt angle (approximately 3.5° to 7°), and a liquid crystal molecule in contact with a region having a small orientation degree has a relatively small pre-tilt angle (approximately 1.5° to 4°). These two regions can be formed in each pixel, in every other pixel, or in every few pixels. Note that a change in the pre-tilt angle resulting from a change in the film properties of the orientation film has no relation with the orientation degree.

The orientation degree, S, of an orientation film can be calculated from Equation (1) below:

$$S=(D-1)/(D+2) \quad (1)$$

In Equation (1), an infrared dichroic ratio D is calculated from the ratio of the absorbance ($A_1$) of an orientation film when polarized infrared light is incident in a direction parallel to the direction of the rubbing orientation treatment of the orientation film to the absorbance ($A_2$) of the orientation film when polarized infrared light is incident in a direction perpendicular to the direction of the rubbing orientation treatment of the orientation film. That is, $$D=A_1/A_2 \quad (2)$$

Note that the method of measuring the infrared dichroic ratio D is described in S. Ishibashi et al., Liquid Crystals, 4,669 (1989). More specifically, a polarizer is arranged between a light source of an infrared spectro-photometer (preferably FT-IR) and a sample holder which holds a sample having an orientation film. The infrared absorbance ($A_1$) is measured while the sample is fixed to the sample holder such that the rubbing orientation treatment direction of the orientation film is parallel to the polarizing direction of the polarizer. Subsequently, with the orientation film fixed to the sample holder, the sample holder is rotated 90° so that polarized infrared light passing through the polarizer enters the orientation film in a direction perpendicular to the rubbing orientation treatment direction. In this state the infrared absorbance ($A_2$) is measured. The dichroic difference is calculated from the value of $A_1-A_2$ at the wavelength which shows a strong absorption (peak) using the infrared absorbances $A_1$ and $A_2$ thus measured. The dichroic ratio is calculated from the value of $A_1/A_2$. When a polyimide is used as the material of the orientation film, the value of $A_1-A_2$ at the peak wavelength of an imide ring C—N stretching vibration or of a benzene ring C—C stretching vibration is preferably used as the dichroic difference.

For example, when a polyimide is used as the material of the orientation film a strong absorption of the polyimide appears at 1730 to 1680 $cm^{-1}$, 1520 to 1490 $cm^{-1}$, and 1380 to 1350 $cm^{-1}$. Therefore, it is possible to calculate the dichroic difference from the absorbance ratio ($A_1/A_2$) at these wavelengths.

Consequently, the dichroic ratio ($A_1/A_2$) sometimes changes depending on the thickness of the orientation film used in the measurement or on the measurement mode. If this is the case, the influence of the thickness of the orientation film can be eliminated by expressing the orientation degree in terms of the dichroic difference ($A_1-A_2$) between the absorbances, so this method is more preferable than expressing the orientation degree in terms of the absorbance ratio.

A method (an orientation relaxation treatment) which locally relaxes the orientation of an orientation film is an example of the method of dividing an orientation film into the first region and the second region whose orientation degree is smaller than that in the first region. An example of this orientation relaxation treatment is a treatment by which an orientation film is brought into contact with an organic solvent or a resin containing an organic solvent.

In the present invention, an organic solvent used in the orientation relaxation treatment can be brought into contact with the orientation film in either the liquid state or the gas state. Especially when a stainless-steel mask is used, bringing an organic solvent in the gas state into contact with an orientation film is advantageous as a manufacturing step, since the organic solvent does not penetrate between the mask and the orientation film.

The organic solvent preferably has a solubility parameter ($\delta$) which satisfies $18.2 \times 10^3$ $(J/m^3)^{1/2} \leq \delta \leq 25.8 \times 10^3$ $(J/m^3)^{1/2}$. This is so because organic solvent molecules having this solubility parameter can penetrate into polyimide molecular chains. The penetrated organic solvent molecules widen the spacings between the polyimide molecular chains by swelling the polyimide, thereby decreasing the orientation degree of the polyimide orientation film. Examples of the organic solvent meeting this condition are acetone, ethyl lactate, γ-butyrolactone, and diacetone alcohol.

This organic solvent preferably has a three-dimensional solubility parameter which satisfies all of $0.17 \leq \delta d/(\delta d+\delta p+\delta h) \leq 0.60$, $0.16 \leq \delta p/(\delta d+\delta p+\delta h)$, and $\delta h/(\delta d+\delta p+\delta h) \leq 0.43$ (where $\delta d$ is the component due to dispersion forces, $\delta p$ is the component due to polar forces, and $\delta h$ is the component due to hydrogen bond). The reason for this is that this three-dimensional solubility parameter resembles the three-dimensional solubility parameter of the polyimide orientation film, so the affinity between the organic solvent molecule and the polyimide molecule is maintained high, and this permits the organic solvent molecules to penetrate into the polyimide molecular chains. The penetrated organic solvent molecules widen the spacings between the polyimide molecular chains by swelling the polyimide, thereby decreasing the orientation degree of the polyimide orientation film. Examples of the organic solvent meeting this condition are acetone, ethyl lactate, γ-butyrolactone, and dimethylsulfoxide. It is particularly preferable that the three-dimensional solubility parameter of the organic solvent satisfy $0.37 \leq \delta d/(\delta d+\delta p+\delta h) \leq 0.50$, $0.21 \leq \delta p/(\delta d+\delta p+\delta h) \leq 0.39$, and $0.11 \leq \delta h/(\delta d+\delta p+\delta h) \leq 0.43$. Examples of the organic solvent meeting this condition are acetone, ethyl lactate, γ-butyrolactone, and dimethylsulfoxide.

Examples of the resin which contains the above organic solvent are a cyclized rubber resin, an acrylic resin, a methacrylic resin, a silicone resin, a novolak resin, and a polyamide resin.

An example of the orientation relaxation treatment is a treatment in which an infrared laser or IR lamp light (infrared light) is irradiated on an orientation film. A gas laser and a semiconductor laser are examples of the infrared laser. As the gas laser, it is favorable to use any of a $CO_2$ laser (oscillation wavelength 9 to 11 μm), a CO laser (oscillation wavelength 5 to 6.5 μm), and an $N_2O$ laser (oscillation wavelength 10 to 11 μm), each having an oscillation wavelength at the wavelengths at which an orientation film well absorbs infrared light. Each of these gas lasers is preferably a high-output, transversely excited atmospheric pressure laser (TEA laser). This TEA laser is suitably used in changing the orientation degree in a fine region of 100 to 10,000 μm². This is because the TEA laser can emit infrared radiation with very short pulses of 10 to 200 nanoseconds, and so heat is hardly conducted to the outside of a region irradiated with the laser.

A semiconductor laser is preferable because of the advantages of a small size, a high efficiency, a low power consumption, and a low price. Examples of the semiconductor laser are those made from compounds constituted by a few types of elements selected from Al, In, As, Sb, P, Ga, Pb, Se, Te, Sn, Ge, and S whose oscillation wavelengths are in agreement with the absorption wavelength of an orientation film. Practical examples are AlInAsSb, InGaAsSb, PbSnTe, PbSnSe, PbSSe, PbSeTe, PbGeTe, PbGeSe, PbSnSeTe, and PbSnSSe lasers.

In the present invention, an orientation film is so formed as to have two regions different in the orientation degree (the conformation of a molecular chain). These two regions are almost equal in the physical properties, such as the charging properties and the dielectric constant, and in the chemical properties, such as the element composition of the orientation film and molecular weight. That is, the two regions in the orientation film can be said to have equal properties.

The liquid crystal display of the present invention is applicable to all kinds of displays, such as a twisted nematic (TN) display, a super twisted nematic (STN, SBE) display, and an electrically controlled birefringence (ECB) display, in which the view angle is limited by the difference in the rise direction of liquid crystal molecules when a voltage is applied. Also, a higher-quality display is possible by incorporating an active switching device such as a TFT into each pixel of the liquid crystal display of the present invention.

The changes in the orientation degree and the pre-tilt angle, which were deserved when the present inventors exposed orientation films to organic solvents, will be described below.

Figure 2A:
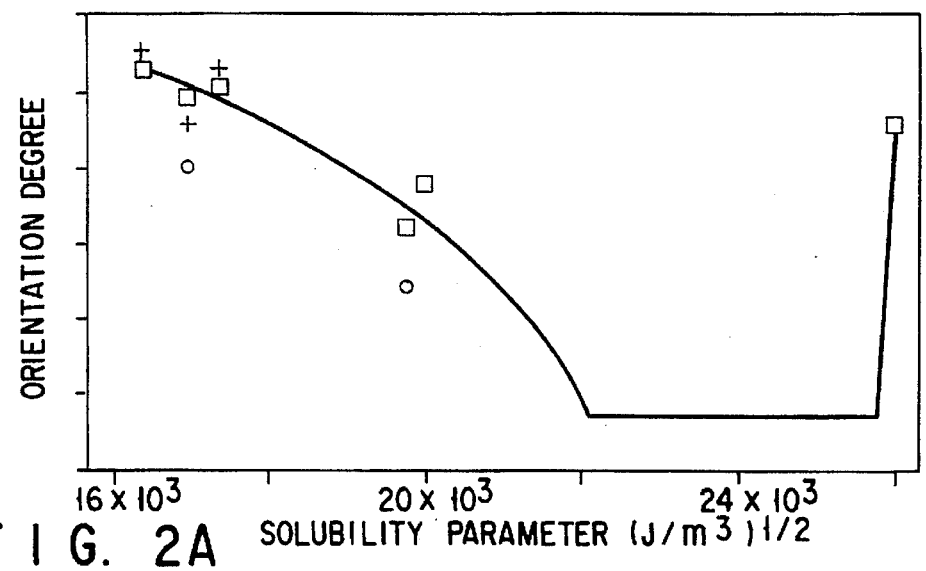
FIG. 2A is a graph showing the relationship between the orientation degree and the solubility parameter in the present invention.
Figure 2B:
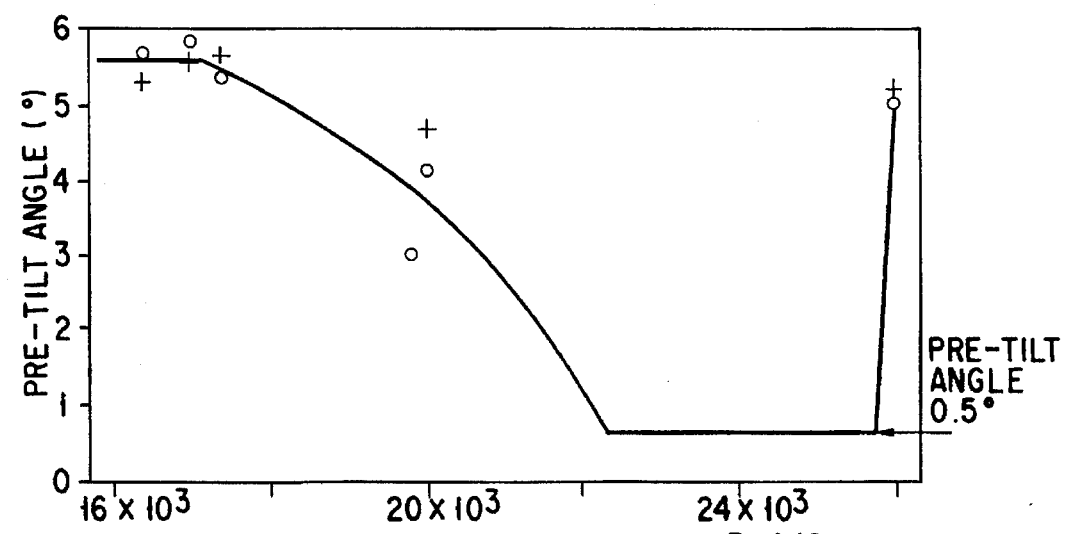
FIG. 2B is a graph showing the relationship between the pre-tilt angle and the solubility parameter in the present invention.

A preimidized soluble polyimide was first used as the material of an orientation film. After being subjected to a rubbing orientation treatment, the orientation film was brought into contact with several types of organic solvents for 10 minutes, and the changes in the orientation degree and the pre-tilt angle were checked. FIGS. 2A and 2B show the relationships between these changes and the solubility parameter. As can be seen from FIGS. 2A and 2B, the orientation degree and the pre-tilt angle similarly decreased when the solubility parameter ($\delta$) of the organic solvent was $18.2 \times 10^3$ $(J/m^3)^{1/2} \leq \delta \leq 25.8 \times 10^3$ $(J/m^3)^{1/2}$. It is, therefore, found from FIGS. 1 and 2A and 2B that the orientation degree of an orientation film and the pre-tilt angle of a liquid crystal molecule have a correlation; that is, the orientation degree decreases in a region of an orientation film, which is brought into contact with a specific organic solvent, and this decreases the pre-tilt angle in that region.

In this manner, the pre-tilt angle of liquid crystal molecules of an orientation film can be controlled by changing the orientation degree of the orientation film by bringing an organic solvent having a proper solubility parameter into contact with the orientation film. Also, the solubility parameter of the organic solvent is preferably $20.0 \times 10^3$ $(J/m^3)^{1/2} \leq \delta \leq 25.8 \times 10^3$ $(J/m^3)^{1/2}$ because in this case the pre-tilt angle is 0.5° to 4°.

FIG. 3 shows the relationship between the three-dimensional solubility parameter and the pre-tilt angle. As in FIG. 3, the orientation degree and the pre-tilt angle decreased when an organic solvent whose three-dimensional solubility parameter satisfied all of $0.17 \leq \delta d/(\delta d+\delta p+\delta h) \leq 0.60$, $0.16 \leq \delta p/(\delta d+\delta p+\delta h)$, and $\delta h/(\delta d+\delta p+\delta h) \leq 0.43$ (where $\delta d$ is the dispersion force, $\delta p$ is the polarity force, and $\delta h$ is the hydrogen bonding force) was brought into contact with a portion of an orientation film. Also, the orientation degree and the pre-tilt angle sufficiently decreases when an organic solvent whose three-dimensional solubility parameter satisfied all of $0.37 \leq \delta d/(\delta d+\delta p+\delta h) \leq 0.50$, $0.21 \leq \delta p/(\delta d+\delta p+\delta h) \leq 0.39$, and $0.11 \leq \delta h/(\delta d+\delta p+\delta h) \leq 0.43$ was brought into contact with a portion of an orientation film. This implies that two regions different in the liquid crystal molecule rise direction can be stably formed by the use of an organic solvent having a solubility parameter in the overlapped hatched portion in FIG. 3 in the orientation relaxation treatment.

As described above, it is found that the pre-tilt angle of the liquid crystal molecules on an orientation film can be controlled by partially changing the orientation degree of the orientation film by bringing an organic solvent having an appropriate solubility parameter or three-dimensional solubility parameter into contact with the orientation film.

An example of the orientation relaxation method of the present invention, other than the contact of an organic solvent described above, is a method of heating an orientation film by using an IR lamp or an infrared laser. When an orientation film is irradiated with IR lamp light or infrared laser light, the temperature of the surface of the orientation film rises. When the temperature of the orientation film material rises close to the glass transition temperature, the motion of the molecules of the orientation film becomes active. As a consequence, the orientation of the orientation film molecular chains that are oriented by the rubbing treatment is relaxed, and this lowers the orientation degree. The glass transition temperature of the orientation film material is far lower than the thermal decomposition temperature. Therefore, even if the orientation film is heated to nearly the glass transition temperature, the orientation degree lowers, and no chemical reaction occurs. Consequently, no such defect as image sticking takes place.

Assuming the glass transition temperature of an orientation film is Tg, a temperature range which gives rise to a proper orientation relaxation is preferably Tg–100° C. to Tg+500° C., and more preferably Tg–50° C. to Tg+30° C. When the material of an orientation film is a polyimide, for example, the temperature of the surface of the orientation film is raised to preferably 200° C. to 350° C., and more preferably 250° C. to 330° C. The method of selectively heating fine regions at a pitch of a half pixel to several pixels includes a method in which heat radiation from, e.g., an IR lamp is irradiated onto an orientation film on which a mask is placed, and a method using an infrared laser in which fine regions are selectively heated by narrowing the spot of the irradiation region of the infrared laser. Note that the infrared laser has intense energy, so the diameter of the irradiation area can be decreased to several ten micrometers or smaller. This makes it possible to perform the orientation relaxation treatment for fine regions within a short time period.

The way the rise direction of liquid crystal molecules changes upon application of a voltage by the use of the method of controlling the pre-tilt angle of the liquid crystal molecules described above will be described below with reference to FIGS. 4A and 4B. FIGS. 4A and 4B are schematic plan views showing a TN cell in which liquid crystal molecules 43 are twisted 90°. In this TN cell, the direction of a rubbing orientation treatment performed for orientation films 42 on substrates 41 is so selected that the direction of a twist of a chiral agent mixed in the liquid crystal material is opposite to the direction in which the liquid crystal molecules 43 are stably twisted 90° by the pre-tilt angle. That is, the orientation treatment direction of the substrates and the twist direction of the chiral agent are so selected that the liquid crystal molecules 43 have a splay deformation.

In FIGS. 4A and 4B, a hatched region in each orientation film 42 is a region (the second region) which is brought into contact with an organic solvent (i.e., subjected to the orientation relaxation treatment) to lower the orientation degree. Consequently, the pre-tilt angle of the liquid crystal molecules on this region (each hatched region) is decreased (a low pre-tilt angle A).

On a single substrate, a region (the second region: which gives a low pre-tilt angle) in which the orientation degree is lowered and a region (the first region, a region except for the hatched region: which gives a high pre-tilt angle) in which the orientation degree is not lowered adjoin each other. On two opposing substrates, the first regions and the second regions are so arranged as to oppose each other. On these two substrates, the liquid crystal molecules 43 are so arranged as to have a splay deformation as shown in FIGS. 4A and 4B. When a voltage is applied to the TN cell in this state (halftone display state), the rise directions of the liquid crystal molecules are aligned with the pre-tilt angle direction of the orientation film with a high pre-tilt angle.

As in FIG. 4B, the second regions are influenced by the opposing first regions, and as a result the rise direction of the liquid crystal molecules in a region I becomes opposite to the rise direction of the liquid crystal molecules 43 in a region II. Since the regions I and II adjoin each other, this means that the rise direction of the liquid crystal molecules 43 in one region is opposite to (different by 180° from) that in an adjacent region in a pixel on the same substrate. Consequently, these two regions compensate for the respective view angle characteristics, and this widens the view angle of the liquid crystal display.

To stably obtain this orientation of liquid crystal molecules, it is desirable that the low pre-tilt angle A be 1.5° to 4°, the high pre-tilt angle B be 3.5° to 7°, and the difference between the low and high pre-tilt angles A and B be 2° to 6° (preferably 3° to 4°).

In the liquid crystal display of the present invention, therefore, it is preferable that $A_1-A_2 \leq 0.3 \times 10^{-3}$ in the region (high-pre-tilt-angle region) having a high orientation degree when a polyimide having a structure represented by Chemical Formula 1 is used and the absorbances $A_1$ and $A_2$ at 1360 cm$^{-1}$ are used, and that $A_1-A_2 \leq 0.25 \times 10^{-3}$ in the region (low-pre-tilt-angle region) having a low orientation degree under the same conditions. Alternatively, ($A_1-A_2$ in the high-pre-tilt-angle region)/($A_1-A_2$ in the low-pre-tilt-angle region)$\geq 1.2$, preferably ($A_1-A_2$ in the high-pre-tilt-angle region)/($A_1-A_2$ in the low-pre-tilt-angle region)$\geq 1.6$.

The difference between the method of decreasing the pre-tilt angle of liquid crystal molecules according to the present invention and a method of decreasing the pre-tilt angle of liquid crystal molecules by irradiating ultraviolet radiation (UV light) will be described below.

Figure 5A:
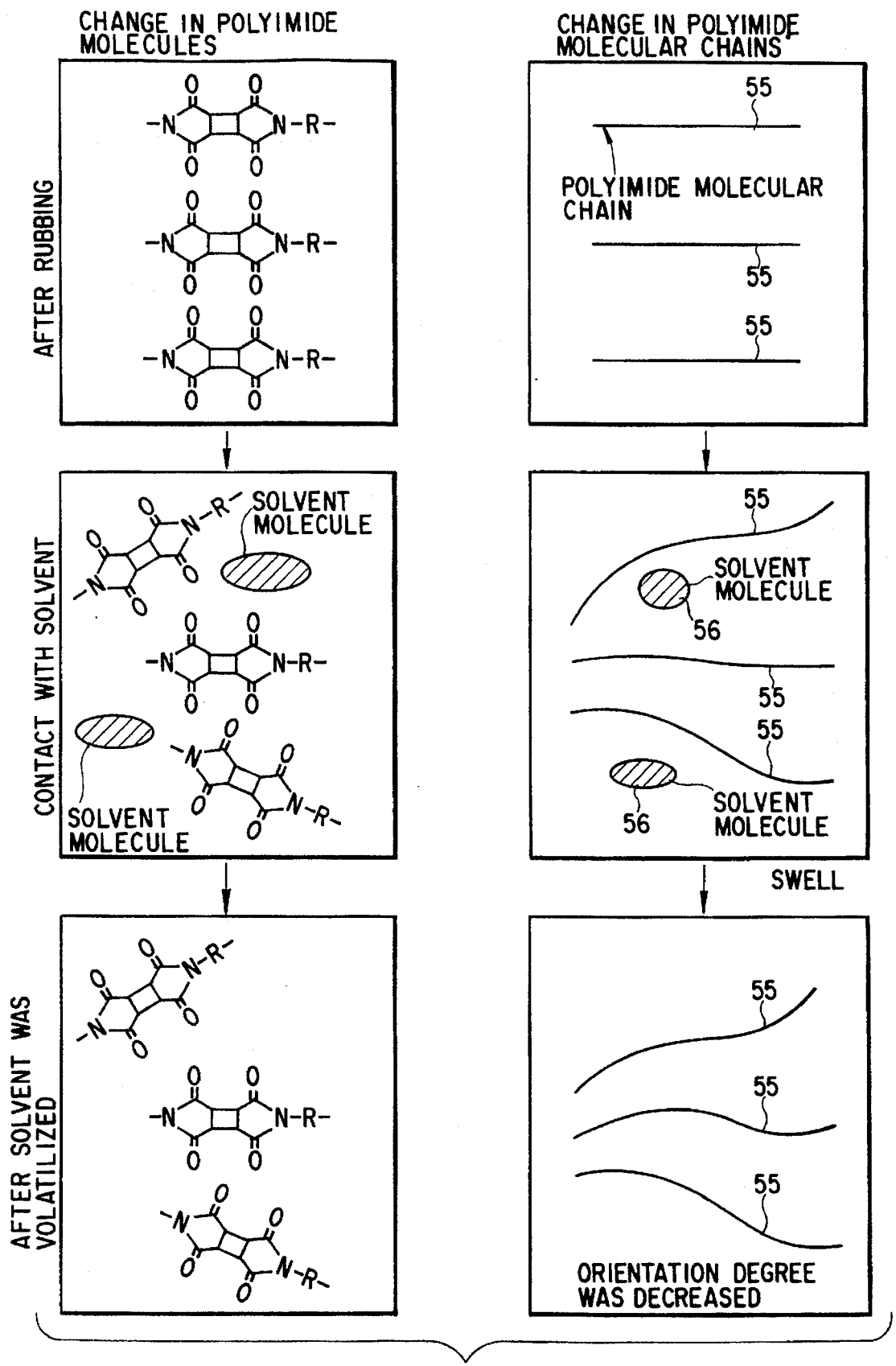
FIG. 5A is a view showing the state of liquid crystal molecules in an orientation film when the pre-tilt angle of the molecules is decreased by the method of the present invention.
Figure 5B:
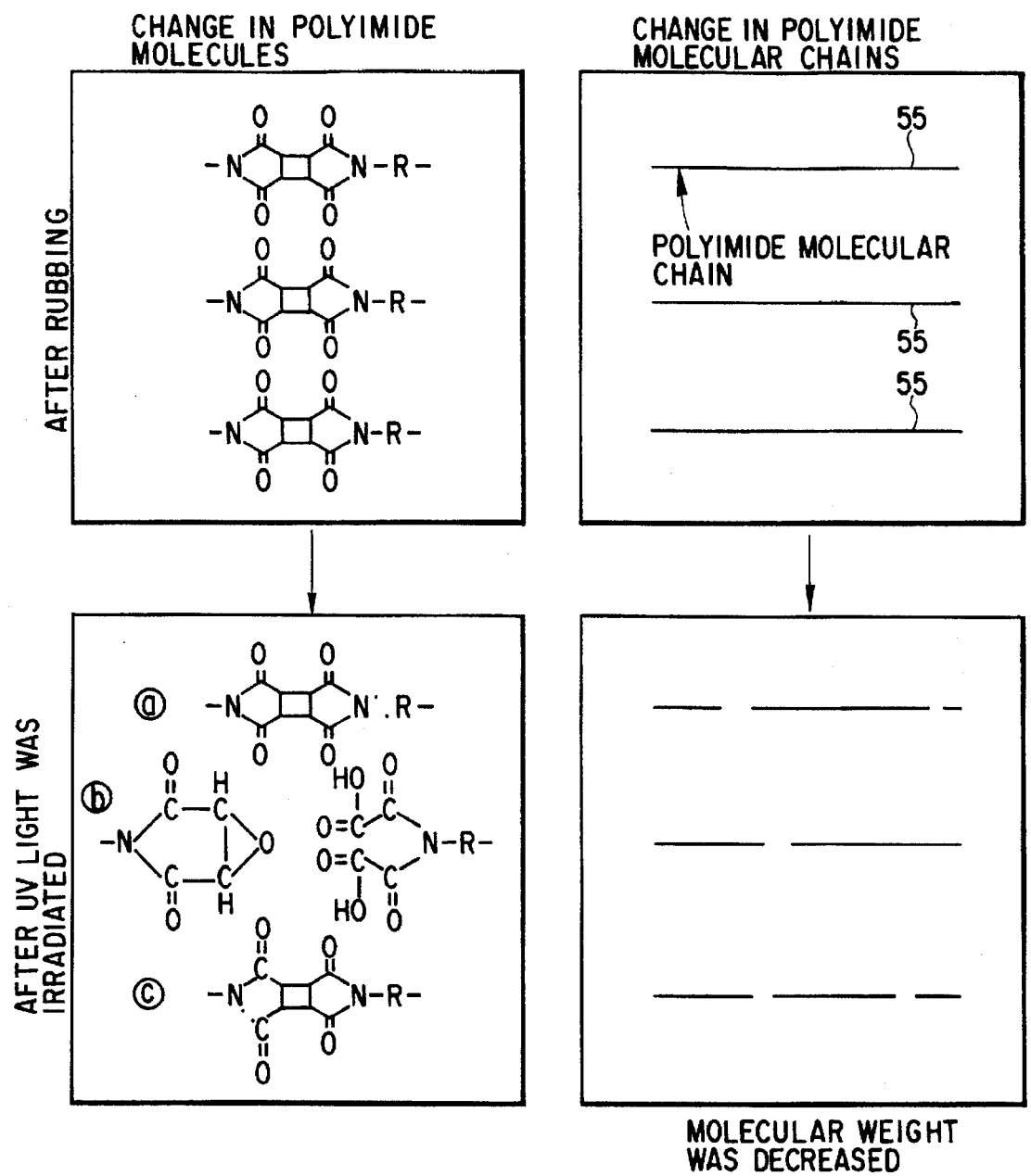
FIG. 5B is a view showing the state of liquid crystal molecules in an orientation film when the pre-tile angle of the molecules is decreased by irradiation of UV light.

First, the difference from the method of changing the orientation degree by irradiating ultraviolet radiation will be described. FIG. 5A is a schematic view showing the state of liquid crystal molecules in an orientation film when the pre-tilt angle of the molecules is decreased by the method of the present invention. FIG. 5B is a schematic view showing the state of liquid crystal molecules in an orientation film when the pre-tilt angle of the molecules is decreased by irradiating UV light. In FIGS. 5A and 5B, a polyimide (Chemical Formula 2) was used as the material of the orientation film.

In the method of the present invention, when an organic solvent is brought into contact with a polyimide film subjected to an orientation treatment using rubbing, the molecules 56 of the organic solvent penetrate between the molecular chains 55 of the polyimide and widen the spacings between the molecular chains 55, thereby relaxing the orientation of the polyimide molecules. When the orientation film is dried by volatilizing the organic solvent by, e.g., heating in this state, the orientation degree of the orientation film is lowered. When a liquid crystal cell is formed by using substrates having orientation films thus formed, the pre-tilt angle of liquid crystal molecules on a region in which the orientation degree is lowered is decreased. Note that in this method, although the orientation degree of the orientation film is changed, the element composition and the molecular weight of the film remain unchanged.

When an orientation film is irradiated with UV light, on the other hand, the polyimide molecules 55 are broken or imide rings are cleaved, producing radicals or radical ions. Then the molecular weight of the polyimide is decreased. In addition, some of these radicals or radical ions combine with atmospheric oxygen to thereby oxidize the polyimide film. The surface of the orientation film is made hydrophilic by the reduction in the molecular weight of the polyimide or the oxidation of the polyimide. That is, the surface energy of the orientation film increases. When the surface energy of the orientation film increases, the interaction between the liquid crystal molecules and the orientation film is affected. As a consequence, the pre-tilt angle of the liquid crystal molecules is lowered.

If the irradiation amount of the UV light is large, the polyimide molecules are strongly broken to give rise to a local ablation. This decreases the thickness of a portion of the orientation film and in some cases changes the surface structure on the film. A change in the surface structure on the film changes the pre-tilt angle.

Assume a liquid crystal cell is formed by using substrates having orientation films in which radicals, radical ions or oxidized portions are produced by breaking or cleavage of the molecules upon irradiation with the UV light. When this liquid crystal cell is driven, the radicals or radical ions in the orientation film trap the charge (electrons or ionic impurities in liquid crystal material). The result is that the orientation film is charged to cause image sticking. Assume also that a liquid crystal cell is formed by using substrates having orientation films oxidized by irradiation of the UV light. Since oxygen atoms have electron attracting properties, when this liquid crystal cell is driven the oxidized portions of the orientation films trap electrons. As a result, the orientation film is charged to cause image sticking. Also, when a liquid crystal cell is formed by using substrates having orientation films whose thicknesses are locally decreased by irradiation of the UV light, the opposing orientation films have different thicknesses. Since the orientation film is a dielectric substance, the difference between the thickness of the orientation film on the upper substrate and that of the orientation film on the lower substrate results in an unbalanced effective voltage being applied to the liquid crystal molecules. The result is a defective display such as image sticking.

As described above, to prevent a defective display such as image sticking, it is preferable to use the method of the present invention and thereby decrease the pre-tilt angle by lowering the orientation degree of the orientation film. It is also preferable that the composition ratios of the elements constituting the orientation film be equal in the first and second regions and the orientation degree of the orientation film in the first region be different from that in the second region, or that the molecular weights of the molecules constituting the orientation film be equal in the first and second regions and the orientation degree of the orientation film in the first region be different from that in the second region.

As the method of obtaining the composition ratio of the elements in an orientation film, it is possible to use, e.g., electron spectroscopy such as ESCA (Electron Spectroscopy for Chemical Analysis) or elemental analysis using thermal decomposition. The ESCA is a high-sensitivity analytical method suitable for measurements of the presence/absence of oxidation on the surface of an orientation film and the composition ratio of the elements on the surface of an orientation film. More specifically, in measuring the composition ratio of the elements by using the ESCA, a substrate having an orientation film is cut into a sample of appropriate dimensions, and the cut sample is placed in an ESCA sample chamber. The measurement is then performed after the sample chamber is evacuated. If the element composition ratios in the first and second regions of the orientation film agree within the range of an experimental error, the composition ratios of the elements constituting the orientation film in the first and second regions can be said to be equal.

As the method of obtaining the molecular weight of the molecules in an orientation film, molecular weight analysis such as GPC (Gel Permeation Chromatography) or viscosity measurement can be used. More specifically, in analyzing the molecular weight by using the GPC, portions of an orientation film in the first and second regions are scraped off from a substrate by using, e.g., a knife. These samples are dissolved in a solvent such as γ-butyrolactone and injected to the GPC. If the molecular weight distributions or the average molecular weights in the first and second regions of the orientation film agree within the range of an experimental error, the molecular weights of the molecules constituting the orientation film in the first and second regions can be said to be equal.

Embodiments of the present invention will be described in detail below with reference to the accompanying drawings.

(Embodiment 1)

FIG. 6 is a view for explaining one embodiment of the liquid crystal display according to the present invention. As illustrated in FIG. 6, TFT devices 53 were formed as switching devices on a transparent substrate as a first substrate, and square pixel electrodes of 200 μm side made from a transparent electrode material such as ITO were also formed on the substrate. These pixel electrodes were partitioned into a matrix form by signal lines 51 and gate lines 52. Storage capacity lines 54 were formed in the center of each pixel so as to divide the pixel into two regions. On the other hand, a transparent electrode was formed on the entire surface of a transparent substrate as a second substrate, and a color filter and a black matrix were formed on the transparent electrode.

On each of the first and second substrates, OPTMER AL (tradename: manufactured by Japan Synthetic Rubber Co. Ltd.) as a solution of a soluble polyimide having a structure represented by C1 (Chemical Formula 1) presented below in a molecule was printed to have a thickness of 600 Å. Each resultant substrate was placed in an oven and heated at 180° C. for 30 min. to volatilize the solvent contained in the solution, thereby forming an orientation film made from the polyimide.

A rubbing orientation treatment was then performed for the orientation films on these substrates. Note that the direction of the rubbing orientation treatment was a direction indicated by the broken lines in FIG. 6 for the orientation film on the first substrate, and a direction indicated by the solid lines in FIG. 6 for the orientation film on the second substrate. Note also that the conditions of the rubbing orientation treatment were that the roller rotating speed was 200 rpm, the roller feed velocity was 25 mm/s, the number of rubbing times was 1, the forced amount (the depth of the deformed region of the rubbing cloth) was 0.4 mm, and the substrate temperature in the rubbing orientation treatment was 70° C.

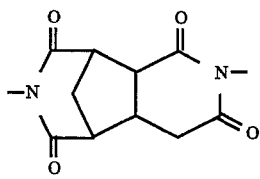

(Chemical Formula 1)

On the orientation films on the first and second substrates thus subjected to the rubbing orientation treatment, acetone ($\delta=20.3\times10^3$ $(J/m^3)^{1/2}$, $\delta d=15.5\times10^3$ $(J/m^3)^{1/2}$, $\delta p=10.4\times10^3$ $(J/m^3)^{1/2}$, $\delta h=7\times10^3$ $(J/m^3)^{1/2}$) was sprayed by using an ink-jet printer. More specifically, the acetone was sprayed only in a half region of each pixel on the first substrate, i.e., only in one of the regions surrounded by the signal lines 51, the gate lines 52, and the storage capacity line 54 in each pixel. In this way an orientation relaxation treatment was performed for the half region of each pixel. After the resultant substrates were left to stand for 5 min., nitrogen gas was sprayed on the entire surfaces of the first and second substrates to completely volatilize the acetone adhered to the orientation films.

A spacer was spread on the first substrate treated as described above, and a sealing material was coated. Thereafter, the first and second substrates were arranged to oppose each other so that the regions brought into contact with the acetone and the regions not brought into contact with the acetone of the orientation films opposed each other, thereby forming a TN cell with a twist angle of 90°. Into this TN cell a liquid crystal material of Np (twisted counterclockwise), i.e., a liquid crystal material in which the liquid crystal molecules were twisted 90° counterclockwise when the first substrate was viewed from the second substrate was injected. In this manner, a liquid crystal display with a cell gap of 6 μm was manufactured.

In this liquid crystal display, the polyimide molecules in the region brought into contact with the acetone swelled to decrease the orientation degree to $3.719\times10^{-3}$. The orientation degree in the region not brought into contact with the acetone was $1.023\times10^{-2}$. Accordingly, the ratio of the orientation degrees of the two regions (the orientation degree in the region not brought into contact with the acetone/the orientation degree in the region brought into contact with the acetone) was 2.75. Consequently, the pre-tilt angle of the liquid crystal molecules on the region brought into contact with the acetone was 2°, and the pre-tilt angle of the liquid crystal molecules on the region not brought into contact with the acetone was 5.5°.

In this liquid crystal display, each pixel had two regions whose liquid crystal molecule rise directions upon application of a voltage were different by 180°. These two regions different in the rise direction compensated for the respective view angles. The result was a liquid crystal display with a wide view angle. In effect, the angle of a region with a contrast 5:1 was 60° in the vertical direction, i.e., a liquid crystal display with a very wide view angle was accomplished.

Although tilt disclination occurred in the boundary between these two regions, this tilt disclination was present below the storage capacity lines. Therefore, the tilt disclination was not seen in a display, resulting in no display problem taking place. In addition, this liquid crystal display showed a good orientation state and was able to provide a high-quality display free of reversal of bright and dark portions caused by a change in the view angle even in a halftone display. Furthermore, since the film properties (the polarity, the charging properties, the dielectric constant, and the thickness) of the region brought into contact with the organic solvent remained almost unchanged, no defective display such as flicker or image sticking occurred.

In this embodiment, the substrate temperature during the rubbing orientation treatment was set at 70° C. This is because the effect of rubbing can be improved by performing the rubbing orientation treatment by increasing the substrate temperature to be higher than room temperature in the formation of the orientation film. This will be described in more detail below.

In the rubbing orientation treatment, frictional heat is generated when the rubbing cloth rubs the polymer constituting the orientation film. This heat softens (in some instances melts) the polymer on the surface of the orientation film. The orientation film thus softened is stretched as it is pulled in the rubbing direction by the rubbing cloth. The higher the degree of softening of the orientation film, the more the orientation film is stretched. In the stretched orientation film, the molecular chains of the polymer are oriented in the direction of the rubbing orientation treatment. On this orientation film, the liquid crystal molecules are oriented in the direction of the rubbing orientation treatment due to the interaction with the molecular chains. Therefore, the orientation film must be sufficiently stretched in order to uniformly orient the liquid crystal molecules with a high reliability.

To sufficiently stretch the orientation film, it is only necessary to perform rubbing strongly. To perform strong rubbing, it is necessary to increase the roller rotating speed, the number of rubbing times, or the forced amount (the depth to which the hairs of the rubbing cloth deform during rubbing). When this is done, however, foreign matter such as glass scraps adhered to the rubbing cloth strongly stretches the orientation film, and thereby the orientation film is easily damaged. This increases the rate of occurrence of defective rubbing.

In this embodiment, therefore, the substrate temperature in the rubbing orientation treatment is increased so that the orientation film is well stretched even with relatively weak rubbing (performed by decreasing the roller rotating speed, the number of rubbing times, or the forced amount), and consequently the liquid crystal molecules are uniformly oriented with a high reliability. That is, since in relatively weak rubbing the generation of frictional heat is little, the polymer on the surface of the orientation film are softened only slightly by the frictional heat. However, the polymer are well softened if the substrate temperature is increased. As a Consequence, the orientation film is sufficiently stretched, and the liquid crystal molecules are uniformly oriented with a high reliability.

Examples of the method of actually heating the substrate are a method in which a sheet heater is provided on the table on which the substrate is fixed and the substrate temperature is controlled by flowing an appropriate current, and a method in which hot air is blown on the upper surface of the substrate. The substrate temperature is appropriately 30° C. to 200° C. The substrate temperature is most preferably 50° to 120° C. when the temperature rise in the rubbing cloth or the temperature rise in the environment of the rubbing apparatus during the rubbing orientation treatment is taken into consideration.

In the rubbing orientation treatment of this embodiment, none of the 300 devices was made defective by scratches during the rubbing, and this greatly improved the yield and reliability. Also, the time required for the rubbing step was shortened because the number of rubbing times was reduced.

(Embodiment 2)

FIG. 7 is a view for explaining another embodiment of the liquid crystal display according to the present invention. As illustrated in FIG. 7, TFT devices 53 were formed as switching devices on a transparent substrate as a first substrate, and square pixel electrodes of 200 μm side made from a transparent electrode material such as ITO were also formed on the substrate. These pixel electrodes were partitioned into a matrix form by signal lines 51 and gate lines 52. On the other hand, a transparent electrode was formed on the entire surface of a transparent substrate as a second substrate, and a color filter and a black matrix were formed on the transparent electrode.

On each of the first and second substrates, OPTMER AL (tradename: manufactured by Japan Synthetic Rubber Co. Ltd.) as a solution of a soluble polyimide having a structure represented by C1 (Chemical Formula 1) presented earlier in a molecule was printed to have a thickness of 600 Å. Each resultant substrate was placed in an oven and heated at 180° C. for 30 min. to volatilize the solvent contained in the solution, thereby forming an orientation film made from the polyimide. A rubbing orientation treatment was then performed for the orientation films on these substrates. Note that the direction of the rubbing orientation treatment was a direction indicated by the broken lines in FIG. 7 for the orientation film on the first substrate, and a direction indicated by the solid lines in FIG. 7 for the orientation film on the second substrate. Note also that the conditions of the rubbing orientation treatment were that the roller rotating speed was 200 rpm, the roller feed velocity was 25 mm/s, the number of rubbing times was 1, and the forced amount was 0.4 mm.

On the orientation film of the first substrate thus subjected to the rubbing orientation treatment, ethyl lactate ($\delta=20.5\times 10^3$ $(J/m^3)^{1/2}$, $\delta d=16\times 10^3$ $(J/m^3)^{1/2}$, $\delta p=7.6\times 10^3$ $(J/m^3)^{1/2}$, $\delta h=12.5\times 10^3$ $(J/m^3)^{1/2}$) was coated (on every other pixel to form a check pattern) as illustrated in FIG. 7 by using a screen printer. In this way an orientation relaxation treatment was performed.

FIG. 7 shows the directions of the rubbing orientation treatment described above and the regions brought into contact with the ethyl lactate. Additionally, as in FIG. 7, the orientation relaxation treatment was similarly performed for the second substrate by using the screen printer by locally spraying the ethyl lactate on regions corresponding to the regions of the first substrate not subjected to the orientation relaxation treatment. After the resultant substrates were left to stand for 10 min., nitrogen gas was sprayed on the entire surfaces of the first and second substrates to completely volatilize the ethyl lactate adhered to the orientation films.

A spacer was spread on the first substrate treated as described above, and a sealing material was coated. Thereafter, the first and second substrates were arranged to oppose each other so that the regions brought into contact with the ethyl lactate and the regions not brought into contact with the ethyl lactate of the orientation films opposed each other, thereby forming a TN cell with a twist angle of 90°. Into this TN cell a liquid crystal material of Np (twisted counterclockwise) was injected. In this manner, a liquid crystal display with a cell gap of 6 μm was manufactured.

In this liquid crystal display, the polyimide molecules in the region brought into contact with the ethyl lactate swelled to decrease the orientation degree, and the pre-tilt angle of the liquid crystal molecules on that region was 3°. On the other hand, the pre-tilt angle of the liquid crystal molecules on the region not brought into contact with the ethyl lactate was 6°. Note that the ratio of the orientation degrees (the orientation degree in the region not brought into contact with the ethyl lactate/the orientation degree in the region brought into contact with the ethyl lactate) was 2.

In this liquid crystal display, pixels adjoining in the vertical direction or the horizontal direction had liquid crystal molecule rise directions upon application of a voltage different by 180°. These two regions different in the rise direction compensated for the respective view angles. The result was a liquid crystal display with a wide view angle. In effect, the angle of a region with a contrast 5:1 was 65° in the vertical direction, i.e., a liquid crystal display with a very wide view angle was accomplished.

Although tilt disclination occurred in the boundary between these two regions, this tilt disclination was present below the signal lines and the gate lines. Therefore, the tilt disclination was not seen in a display, resulting in no display problem taking place. In addition, this liquid crystal display showed a good orientation state and was able to provide a high-quality display free of reversal of bright and dark portions caused by a change in the view angle even in a halftone display. Furthermore, since the film properties (the polarity, the charging properties, the dielectric constant, and the thickness) of the region brought into contact with the organic solvent remained almost unchanged, no defective display such as flicker or image sticking occurred.

(Embodiment 3)

Figure 8:
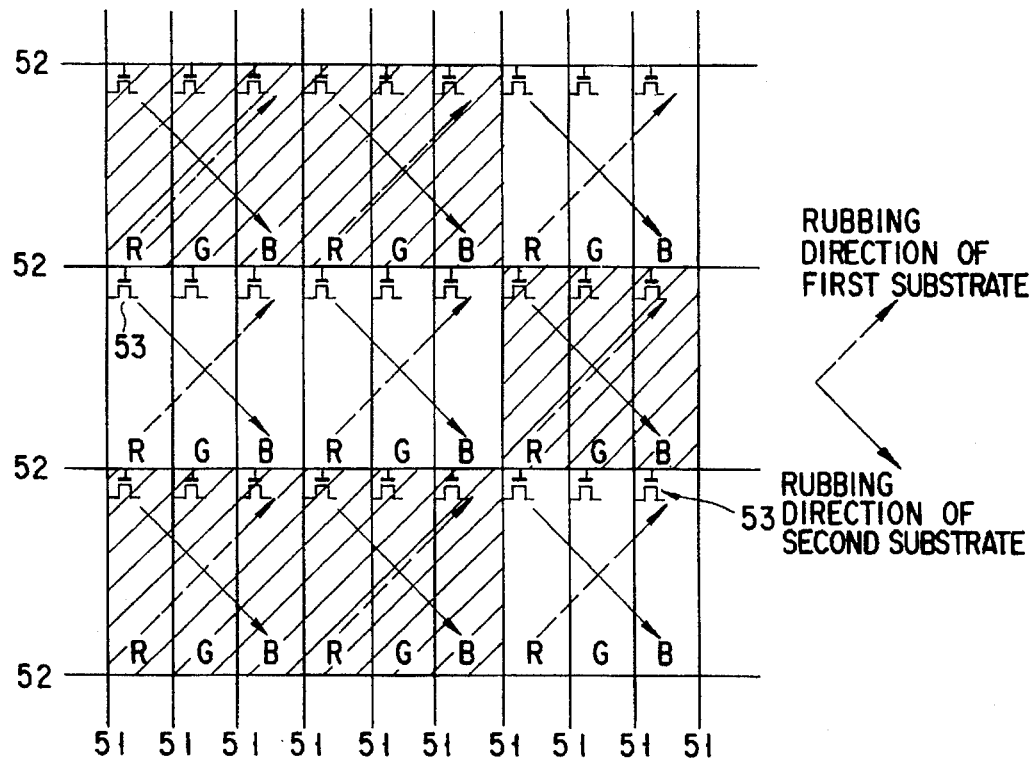

FIG. 8 is a view for explaining still another embodiment of the liquid crystal display according to the present invention. As illustrated in FIG. 8, TFT devices 53 were formed as switching devices on a transparent substrate as a first substrate, and square pixel electrodes of 40 μm side made from a transparent electrode material such as ITO were also formed on the substrate. These pixel electrodes were partitioned into a matrix form by signal lines 51 and gate lines 52. On the other hand, a transparent electrode was formed on the entire surface of a transparent substrate as a second substrate, and a color filter and a black matrix were formed on the transparent electrode.

On each of the first and second substrates, SUNEVER (polyamic acid type, tradename: manufactured by Nissan Chemical Industries Ltd.) as a solution of a thermosetting polyimide was printed to have a thickness of 600 Å. Each resultant substrate was placed in an oven and imidized by heating at 250° C. for 30 min., forming a polyimide orientation film having a structure represented by C2 (Chemical Formula 2) presented below in a molecule. A rubbing orientation treatment was then performed for the orientation films on these substrates. Note that the direction of the rubbing orientation treatment was a direction indicated by the broken lines in FIG. 8 for the orientation film on the first substrate, and a direction indicated by the solid lines in FIG. 8 for the orientation film on the second substrate. Note also that the conditions of the rubbing orientation treatment were that the roller rotating speed was 400 rpm, the roller feed velocity was 12.5 mm/s, the number of rubbing times was 3, and the forced amount was 0.5 mm.

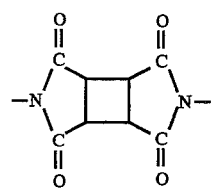

(Chemical Formula 2)

On the orientation films thus subjected to the rubbing orientation treatment, γ-butyrolactone ($\delta=25.8\times 10^3$ $(J/m^3)^{1/2}$, $\delta d=19\times 10^3$ $(J/m^3)^{1/2}$, $\delta p=16.6\times 10^3$ $(J/m^3)^{1/2}$, $\delta h=7.4\times 10^3$ $(J/m^3)^{1/2}$) was coated (on every two other pixels to form a check pattern) as illustrated in FIG. 8 by using a bubble-jet printer. In this way an orientation relaxation treatment was performed.

FIG. 8 shows the directions of the rubbing orientation treatment described above and the regions brought into contact with the γ-butyrolactone. As in FIG. 8, the orientation relaxation treatment was similarly performed for the second substrate by using the bubble-jet printer by locally spraying the γ-butyrolactone on regions corresponding to the regions of the first substrate not subjected to the orientation relaxation treatment. After the resultant substrates were left to stand for 10 min., nitrogen gas was sprayed on the entire surfaces of the first and second substrates to completely volatilize the γ-butyrolactone adhered to the orientation films.

A spacer was spread on the first substrate treated as described above, and a sealing material was coated. Thereafter, the first and second substrates were arranged to oppose each other so that the regions brought into contact with the γ-butyrolactone and the regions not brought into contact with the γ-butyrolactone of the orientation films opposed each other, thereby forming a TN cell with a twist angle of 90°. Into this TN cell a liquid crystal material of Np (twisted counterclockwise) was injected. In this manner, a liquid crystal display with a cell gap of 6 μm was manufactured. This liquid crystal display was observed with a microscope, and it was found that the liquid crystal molecules had a splay deformation.

In this liquid crystal display, the polyimide molecules in the region brought into contact with the γ-butyrolactone swelled to decrease the orientation degree, and the pre-tilt angle of the liquid crystal molecules on that region was 2°. On the other hand, the pre-tilt angle of the liquid crystal molecules on the region not brought into contact with the γ-butyrolactone was 6°. Note that the orientation degree in the region not brought into contact with the γ-butyrolactone/ the orientation degree in the region brought into contact with the γ-butyrolactone was 3.

In this liquid crystal display, pixels adjoining in the vertical direction or the horizontal direction had liquid crystal molecule rise directions upon application of a voltage different by 180°. These two regions different in the rise direction compensated for the respective view angles. The result was a liquid crystal display with a wide view angle. In effect, the angle of a region with a contrast 5:1 was 55° in the vertical direction, i.e., a liquid crystal display with a very wide view angle was accomplished.

Although tilt disclination occurred in the boundary between these two regions, this tilt disclination was present below the signal lines and the gate lines. Therefore, the tilt disclination was not seen in a display, resulting in no display problem taking place. In addition, this liquid crystal display showed a good orientation state and was able to provide a high-quality display free of reversal of bright and dark portions caused by a change in the view angle even in a halftone display. Furthermore, since the film properties (the polarity, the charging properties, the dielectric constant, and the thickness) of the region brought into contact with the organic solvent remained almost unchanged, no defective display such as flicker or image sticking occurred.

(Embodiment 4)

This embodiment will be described below with reference to FIG. 6. The same reference numerals as in FIG. 6 denote the same parts, and a detailed description thereof will be omitted.

As illustrated in FIG. 6, TFT devices 53 were formed as switching devices on a transparent substrate as a first substrate, and square pixel electrodes of 100 μm side made from a transparent electrode material such as ITO were also formed on the substrate. These pixel electrodes were partitioned into a matrix form by signal lines and gate lines. Storage capacity lines 54 were formed in the center of each pixel so as to divide the pixel into two regions. On the other hand, a transparent electrode was formed on the entire surface of a transparent substrate as a second substrate, and a color filter and a black matrix were formed on the transparent electrode.

On each of the first and second substrates, OPTMER AL (tradename: manufactured by Japan Synthetic Rubber Co. Ltd.) as a solution of a soluble polyimide having a structure represented by C1 (Chemical Formula 1) presented earlier in a molecule was printed to have a thickness of 600 Å. Each resultant substrate was placed in an oven and heated at 180° C. for 30 min. to volatilize the solvent contained in the solution, thereby forming an orientation film made from the polyimide. A rubbing orientation treatment was then performed for the orientation films on these substrates. Note that the direction of the rubbing orientation treatment was a direction indicated by the broken lines in FIG. 6 for the orientation film on the first substrate, and a direction indicated by the solid lines in FIG. 6 for the orientation film on the second substrate. Note also that the conditions of the rubbing orientation treatment were that the roller rotating speed was 300 rpm, the roller feed velocity was 18 mm/s, the number of rubbing times was 2, and the forced amount was 0.5 mm On the orientation films on the first and second substrates thus subjected to the rubbing orientation treatment, a cyclized-rubber resin containing 20 wt % of acetone as an organic solvent was sprayed by using an ultrasonic-jet printer. More specifically, the acetone was sprayed only in a half region of each pixel on the first substrate, i.e., only in one of the regions surrounded by the signal lines, the gate lines, and the storage capacity line in each pixel. In this way an orientation relaxation treatment was performed for the half region of each pixel.

FIG. 6 shows the directions of the rubbing orientation treatment described above and the regions brought into contact with the acetone. The orientation relaxation treatment was similarly performed for the second substrate by using the ultrasonic-jet printer by locally spraying the cyclized-rubber resin on regions corresponding to the regions of the first substrate not subjected to the orientation relaxation treatment.

After the resultant substrate was left to stand for 5 min., a solution mixture of xylene:n-butyl acetate=70:30 was sprayed on the entire surfaces of the first and second substrates to completely dissolve the cyclized-rubber resin adhered to the orientation films. Subsequently, the first and second substrates were rinsed with n-butyl acetate, and nitrogen gas was sprayed on the entire surfaces of the resultant first and second substrates to completely volatilize the n-butyl acetate adhered to the orientation films.

A spacer was spread on the first substrate treated as described above, and a sealing material was coated. Thereafter, the first and second substrates were arranged to oppose each other so that the regions brought into contact with the acetone and the regions not brought into contact with the acetone of the orientation films opposed each other, thereby forming a TN cell with a twist angle of 90°. Into this TN cell a liquid crystal material of Np (twisted counterclockwise) was injected. In this manner, a liquid crystal display with a cell gap of 6 μm was manufactured.

In this liquid crystal display, the polyimide molecules in the region brought into contact with the acetone swelled to decrease the orientation degree, and the pre-tilt angle of the liquid crystal molecules on that region was 2°. The pre-tilt angle of the liquid crystal molecules on the region not brought into contact with the acetone was 6°. Note that the ratio of the orientation degrees (the orientation degree in the region not brought into contact with the acetone/the orientation degree in the region brought into contact with the acetone) was 3.

In this liquid crystal display, each pixel had two regions whose liquid crystal molecule rise directions upon application of a voltage were different by 180°. These two regions different in the rise direction compensated for the respective view angles. The result was a liquid crystal display with a wide view angle. In effect, the angle of a region with a contrast 5:1 was 70° in the vertical direction, i.e., a liquid crystal display with a very wide view angle was accomplished.

Although tilt disclination occurred in the boundary between these two regions, this tilt disclination was present below the storage capacity lines 54. Therefore, the tilt disclination was not seen in a display, resulting in no display problem taking place. In addition, this liquid crystal display showed a good orientation state and was able to provide a high-quality display free of reversal of bright and dark portions caused by a change in the view angle even in a halftone display. Furthermore, since the film properties (the polarity, the charging properties, the dielectric constant, and the thickness) of the region brought into contact with the organic solvent remained almost unchanged, no defective display such as flicker or image sticking occurred.

(Embodiment 5)

This embodiment will be described below with reference to FIGS. 9A, 9B, and 10. In this embodiment an orientation relaxation treatment was done only for a first substrate.

The way the rise direction of liquid crystal molecules changes upon application of a voltage by the use of the method of controlling the pre-tilt angle of the liquid crystal molecule described above will be described below with reference to FIGS. 9A and 9B. FIGS. 9A and 9B are schematic plan views showing a TN cell in which liquid crystal molecules 43 are twisted 90°. In this TN cell, the direction of a rubbing orientation treatment performed for orientation films 42 on substrates 41 is so selected that the direction of the twist of a chiral agent mixed in a liquid crystal material is opposite to the direction in which the liquid crystal molecules 43 are stably twisted 90° by the pre-tilt angle. That is, the orientation treatment direction of the substrates and the twist direction of the chiral agent are so selected that the liquid crystal molecules 43 have a splay deformation.

Figure 9A:
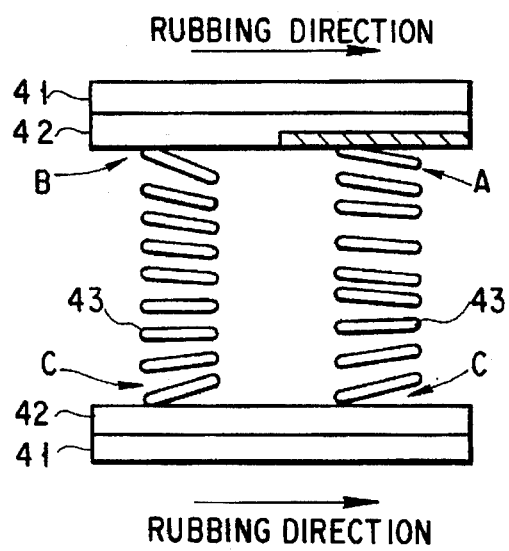
Figure 9B:
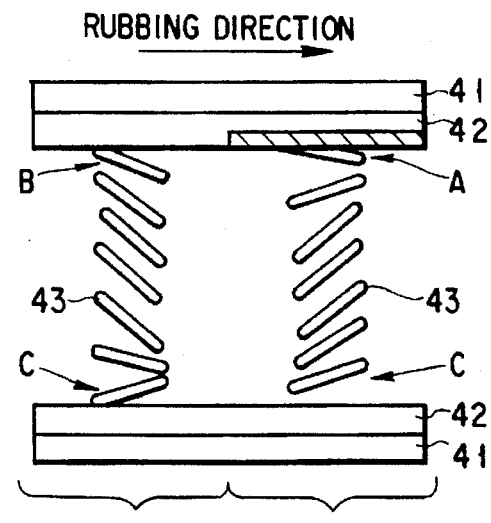

In FIGS. 9A and 9B, a hatched region in each orientation film 42 is a region (the second region) which is brought into contact with an organic solvent (i.e., subjected to the orientation relaxation treatment) to lower the orientation degree. Consequently, the pre-tilt angle of the liquid crystal molecules on this region (each hatched region) is decreased (a low pre-tilt angle A).

On a single substrate, the tilt-up direction of the low pre-tilt angle A in the region in which the orientation degree is lowered is in agreement with the tilt-up direction of a high pre-tilt angle B in an adjoining region (the first region, a region except for the hatched region) in which the orientation degree is not lowered.

A liquid crystal cell is assembled using a pair of substrates which are so rubbed as to have a pre-tilt angle C intermediate between the high pre-tilt angle B in the first region and the low pre-tilt angle A in the second region. In this liquid crystal cell, the two substrates are so arranged that the liquid crystal molecules 43 have a splay deformation as shown in FIGS. 9A and 9B.

A method of manufacturing the liquid crystal display of this embodiment will be described below with reference to FIG. 10.

First, TFT devices 53 were formed as switching devices on a transparent substrate as a first substrate, and square pixel electrodes of 100 μm side made from a transparent electrode material such as ITO were also formed on the substrate. These pixel electrodes were partitioned into a matrix form by signal lines and gate lines. Storage capacity lines were formed in the center of each pixel so as to divide the pixel into two regions. On the other hand, a transparent electrode was formed on the entire surface of a transparent substrate as a second substrate, and a color filter and a black matrix were formed on the transparent electrode.

On the first substrate (on the TFT device side), OPTMER AL (tradename: manufactured by Japan Synthetic Rubber Co. Ltd.) as a solution of a soluble polyimide having a structure represented by C1 (Chemical Formula 1) presented earlier in a molecule was printed to have a thickness of 600 Å. The resultant substrate was placed in an oven and heated at 180° C. for 30 min. to volatilize the solvent contained in the solution, thereby forming an orientation film made from the polyimide. A rubbing orientation treatment was then performed for the orientation film. Note that the direction of the rubbing orientation treatment was a direction indicated by the broken lines in FIG. 10. Note also that the conditions of the rubbing orientation treatment were that the roller rotating speed was 300 rpm, the roller feed velocity was 18 mm/s, the number of rubbing times was 2, and the forced amount was 0.6 mm.

Subsequently, on the second substrate (on the color filter side), OPTMERAL (tradename: manufactured by Japan Synthetic Rubber Co. Ltd.) as a solution of a soluble polyimide having a structure represented by C1 (Chemical Formula 1) presented earlier in a molecule was printed to have a thickness of 600 Å. The resultant substrate was placed in an oven and heated at 180° C. for 30 min. to volatilize the solvent contained in the solution, thereby forming an orientation film made from the polyimide. A rubbing orientation treatment was then performed for the orientation film. Note that the direction of the rubbing orientation treatment was a direction indicated by the solid lines in FIG. 10. Note also that the conditions of the rubbing orientation treatment were that the roller rotating speed was 200 rpm, the roller feed velocity was 25 mm/s, the number of rubbing times was 1, and the forced amount was 0.5 mm.

Subsequently, a novolak resin containing 20 wt % of acetone as an organic solvent was sprayed on the orientation film on the first substrate by using an ultrasonic-jet printer. More specifically, the acetone was sprayed only in a half region of each pixel on the first substrate, i.e., only in one of the regions surrounded by the signal lines, the gate lines, and the storage capacity line in each pixel. In this way an orientation relaxation treatment was performed for the half region of each pixel.

After the resultant first substrate was left to stand for 15 min., a solution mixture of xylene:n-butyl acetate=70:30 was sprayed on the entire surface of the substrate to completely dissolve the novolak resin adhered to the orientation film. Subsequently, the first substrate was rinsed with n-butyl acetate, and nitrogen gas was sprayed on the entire surface of the resultant first substrate to completely volatilize the n-butyl acetate adhered to the orientation film.

Consequently, the polyimide molecules in the region brought into contact with the acetone swelled to decrease the orientation degree, and the pre-tilt angle of the liquid crystal molecules on that region was 1.5°. The pre-tilt angle of the liquid crystal molecules on the region not brought into contact with the acetone was 6°. Note that the pre-tilt angle of the liquid crystal molecules on the second substrate was 3.5°. Note also that the ratio of the orientation degrees (the orientation degree of the region not brought into contact with the acetone/the orientation degree of the region brought into contact with the acetone) was 4.

A spacer was spread on the first substrate treated as described above, and a sealing material was coated. Thereafter, the first and second substrates were made oppose each other to form a TN cell with a twist angle of 90°. Into this TN cell a liquid crystal material of Np (twisted counterclockwise) was injected. In this manner, a liquid crystal display with a cell gap of 6 μm was manufactured.

In this liquid crystal display, each pixel had two regions whose liquid crystal molecule rise directions upon application of a voltage were different by 180°. These two regions different in the rise direction compensated for the respective view angles. The result was a liquid crystal display with a wide view angle. In effect, the angle of a region with a contrast 5:1 was 60° in the vertical direction, i.e., a liquid crystal display with a very wide view angle was accomplished.

Although tilt disclination occurred in the boundary between these two regions, this tilt disclination was present below the storage capacity lines 54. Therefore, the tilt disclination was not seen in a display, resulting in no display problem taking place. In addition, this liquid crystal display showed a good orientation state and was able to provide a high-quality display free of reversal of bright and dark portions caused by a change in the view angle even in a halftone display. Furthermore, since the film properties (the polarity, the charging properties, the dielectric constant, and the thickness) of the region brought into contact with the organic solvent remained almost unchanged, no defective display such as flicker or image sticking occurred.

As in this embodiment, regions different in the liquid crystal molecule rise direction can also be formed by forming a low-pre-tilt-angle region (a region in which the orientation degree is low) and a high-pre-tilt-angle region (a region in which the orientation degree is high) in an orientation film on one substrate, allowing an orientation film on the other substrate to have an intermediate pre-tilt angle (a region having an intermediate orientation degree) of the low and high pre-tilt angles, and making these two substrates oppose each other.

(Embodiment 6)

In this embodiment, an organic solvent in the gas state was used in the orientation relaxation treatment in Embodiment 1. Therefore, the arrangement of the apparatus is identical with that of Embodiment 1, so this embodiment will be described with reference to FIG. 6.

The manufacturing steps up to the step of rubbing the first and second substrates were done following the same procedure as in Embodiment 1.

A 1-mm thick stainless-steel mask was placed on each orientation film subjected to the rubbing orientation treatment. The spacing between the orientation film and the mask was set to 5 μm, and the mask was so adjusted that each hole of the mask covered only a half region of each pixel. That is, the stainless-steel mask was so arranged as to cover only one of regions surrounded by signal lines 51, gate lines 52, and a storage capacity line 54 in each pixel. Note that this stainless-steel mask was made by forming holes in a stainless-steel plate by irradiating a laser beam.

Subsequently, as illustrated in FIG. 11, the first or second substrate, 41, having the orientation film, 42, on which the stainless-steel mask, 61, was placed was arranged above a beaker 62 containing an organic substance 63, so that the mask 61 opposed the organic substance 63. This was done with the substrate 41 and the beaker 62 placed in a closed vessel 64.

In this embodiment acetone ($\delta=20.3\times10^3$ $(J/m^3)^{1/2}$, $\delta d=15.5\times10^3$ $(J/m3)^{1/2}$, $\delta p=10.4\times10^3$ $(J/m^3)^{1/2}$, $\delta h=7\times10^3$ $(J/m^3)^{1/2}$) was used as the organic substance 63. Note that the distance between the liquid surface of the acetone and the orientation film was 10 mm.

The apparatus was then heated using a heater (not shown) such that the temperatures of the vessel 64 and the acetone were 30° C. Consequently, the vessel 64 was filled up with a saturated vapor of the acetone. The apparatus was left to stand in this state for 30 min. As a result, a region of the orientation film 42 not covered with the mask 61 was brought into contact with the saturated acetone vapor. This region was selectively relaxed in orientation to decrease the pre-tilt angle. The substrate was removed from the vessel after an elapse of 30 min., and nitrogen gas was sprayed onto the entire surface of the substrate to completely volatilize the acetone adhered to the orientation film.

A spacer was spread on the first substrate treated as described above, and a sealing material was coated. Thereafter, the first and second substrates were arranged to oppose each other so that the regions brought into contact with the acetone vapor and the regions not brought into contact with the acetone vapor of the orientation films opposed each other, thereby forming a TN cell with a twist angle of 90°. Into this TN cell a liquid crystal material of Np (twisted counterclockwise) was injected. In this manner, a liquid crystal display with a cell gap of 6 μm was manufactured.

In this liquid crystal display, the polyimide molecules in the region brought into contact with the acetone vapor swelled to decrease the orientation degree to $3.718\times10^{-3}$. The orientation degree in the region not brought into contact with the acetone vapor was $1.024\times10^{-2}$. Accordingly, the ratio of the orientation degrees of the two regions (the orientation degree in the region not brought into contact with the acetone vapor/the orientation degree in the region brought into contact with the acetone vapor) was 2.75. Consequently, the pre-tilt angle of the liquid crystal molecules on the region brought into contact with the acetone vapor was 2°, and the pre-tilt angle of the liquid crystal molecules on the region not brought into contact with the acetone vapor was 5.5°.

In this liquid crystal display, each pixel had two regions whose liquid crystal molecule rise directions upon application of a voltage were different by 180°. These two regions different in the rise direction compensated for the respective view angles. The result was a liquid crystal display with a wide view angle. In effect, the angle of a region with a contrast 5:1 was 60° in the vertical direction, i.e., a liquid crystal display with a very wide view angle was accomplished.

Although tilt disclination occurred in the boundary between these two regions, this tilt disclination was present below the storage capacity lines 54. Therefore, the tilt disclination was not seen in a display, resulting in no display problem taking place. In addition, this liquid crystal display showed a good orientation state and was able to provide a high-quality display free of reversal of bright and dark portions caused by a change in the view angle even in a halftone display. Furthermore, since the film properties (the polarity, the charging properties, the dielectric constant, and the thickness) of the region brought into contact with the organic solvent remained almost unchanged, no defective display such as flicker or image sticking occurred.

(Embodiment 7)

In this embodiment, an organic solvent in the gas state was used in the orientation relaxation treatment in Embodiment 2. Therefore, the arrangement of the apparatus is identical with that of Embodiment 2, so this embodiment will be described with reference to FIG. 7.

The manufacturing steps up to the step of rubbing the first and second substrates were done following the same procedure as in Embodiment 1.

A 0.5-mm thick titanium mask was placed on each orientation film subjected to the rubbing orientation treatment. The spacing between the orientation film and the mask was set to 5 μm, and the mask was so arranged (on every other pixel to form a check pattern) as illustrated in FIG. 7. This titanium mask was made by forming holes in a titanium plate by irradiating a laser beam.

Subsequently, as illustrated in FIG. 11, the first or second substrate, 41, having the orientation film, 42, on which the titanium mask, 61, was placed was arranged above a beaker 62 containing an organic substance 63, so that the mask 61 opposed the organic substance 63. This was done with the substrate 41 and the beaker 62 placed in a closed vessel 64.

In this embodiment ethyl lactate ($\delta=20.5\times10^3$ $(J/m^3)^{1/2}$, $\delta d=16\times10^3$ $(J/m^3)^{1/2}$, $\delta p=7.6\times10^3$ $(J/m^3)^{1/2}$, $\delta h=12.5\times10^3$ $(J/m^3)^{1/2}$) was used as the organic substance 63. Note that the distance between the liquid surface of the ethyl lactate and the orientation film was 10 mm.

The apparatus was then heated using a heater (not shown) such that the temperatures of the vessel 64 and the ethyl lactate were 50° C. Consequently, the vessel 64 was filled up with a saturated vapor of the ethyl lactate. The apparatus was left to stand in this state for 30 min. As a result, a region of the orientation film 42 not covered with the mask 61 was brought into contact with the saturated ethyl lactate vapor. This region was selectively relaxed in orientation to decrease the pre-tilt angle. The substrate was removed from the vessel after an elapse of 30 min., and nitrogen gas was sprayed onto the entire surface of the substrate to completely volatilize the ethyl lactate adhered to the orientation film.

A spacer was spread on the first substrate treated as described above, and a sealing material was coated. Thereafter, the first and second substrates were arranged to oppose each other so that the regions brought into contact with the ethyl lactate vapor and the regions not brought into contact with the ethyl lactate vapor of the orientation films opposed each, other, thereby forming a TN cell with a twist angle of 90°. Into this TN cell a liquid crystal material of Np (twisted counterclockwise) was injected. In this manner, a liquid crystal display with a cell gap of 5.5 μm was manufactured.

In this liquid crystal display, the polyimide molecules in the region brought into contact with the ethyl lactate vapor swelled to decrease the orientation degree to $3.729\times10^{-3}$. The orientation degree in the region not brought into contact with the ethyl lactate vapor was $1.024\times10^{-2}$. Accordingly, the ratio of the, orientation degrees of the two regions (the orientation degree in the region not brought into contact with the ethyl lactate vapor/the orientation degree in the region brought into contact with the ethyl lactate vapor) was 2.75. Consequently, the pre-tilt angle of the liquid crystal molecules on the region brought into contact with the ethyl lactate vapor was 2°, and the pre-tilt angle of the liquid crystal molecules on the region not brought into contact with the ethyl lactate vapor was 5.5°.

In this liquid crystal display, each pixel had two regions whose liquid crystal molecule rise directions upon application of a voltage were different by 180°. These two regions different in the rise direction compensated for the respective view angles. The result was a liquid crystal display with a wide view angle. In effect, the angle of a region with a contrast 5:1 was 60° in the vertical direction, i.e., a liquid crystal display with a very wide view angle was accomplished.

Although tilt disclination occurred in the boundary between these two regions, this tilt disclination was present below signal lines and gate lines. Therefore, the tilt disclination was not seen in a display, resulting in no display problem taking place. In addition, this liquid crystal display showed a good orientation state and was able to provide a high-quality display free of reversal of bright and dark portions caused by a change in the view angle even in a halftone display. Furthermore, since the film properties (the polarity, the charging properties, the dielectric constant, and the thickness) of the region brought into contact with the organic solvent remained almost unchanged, no defective display such as flicker or image sticking occurred.

(Embodiment 8)

In this embodiment, an organic solvent in the gas state was used in the orientation relaxation treatment in Embodiment 3. Therefore, the arrangement of the apparatus is identical with that of Embodiment 3, so this embodiment will be described with reference to FIG. 8.

The manufacturing steps up to the step of rubbing the first and second substrates were done following the same procedure as in Embodiment 1.

A 1-mm thick Teflon mask was placed on each orientation film subjected to the rubbing orientation treatment. The spacing between the orientation film and the mask was set to 5 μm, and the mask was so adjusted that each hole of the mask covered a half region of each pixel. Note that this mask had holes (corresponding to the hatched portions in the first substrate and the unhatched portions in the second substrate in FIG. 8) formed into a check pattern order to cover the half region of each pixel. This Teflon mask was made by forming holes in a Teflon plate by irradiating a laser beam.

Subsequently, as illustrated in FIG. 11, the first or second substrate, 41, having the orientation film, 42, on which the Teflon mask, 61, was placed was arranged above a beaker 62 containing an organic substance 63, so that the mask 61 opposed the organic substance 63. This was done with the substrate 41 and the beaker 62 placed in a closed vessel 64.

In this embodiment γ-butyrolactone ($\delta=25.8\times10^3$ $(J/m^3)^{1/2}$, $\delta d=19\times10^3$ $(J/m^3)^{1/2}$, $\delta p=16.6\times10^3$ $(J/m^3)^{1/2}$, $\delta h=7.4\times10^3$ $(J/m^3)^{1/2}$) was used as the organic substance 63. Note that the distance between the liquid surface of the γ-butyrolactone and the orientation film was 10 mm.

The apparatus was then heated using a heater (not shown) such that the temperatures of the vessel 64 and the γ-butyrolactone were 25° C. Consequently, the vessel 64 was filled up with a saturated vapor of the γ-butyrolactone. The apparatus was left to stand in this state for 30 min. As a result, a region of the orientation film 42 not covered with the mask 61 was brought into contact with the saturated γ-butyrolactone vapor. This region was selectively relaxed in orientation to decrease the pre-tilt angle. The substrate was removed from the vessel after an elapse of 30 min., and nitrogen gas was sprayed onto the entire surface of the substrate to completely volatilize the γ-butyrolactone adhered to the orientation film.

A spacer was spread on the first substrate treated as described above, and a sealing material was coated. Thereafter, the first and second substrates were arranged to oppose each other so that the regions brought into contact with the γ-butyrolactone vapor and the regions not brought into contact with the γ-butyrolactone vapor of the orientation films opposed each other, thereby forming a TN cell with a twist angle of 90°. Into this TN cell a liquid crystal material of Np (twisted counterclockwise) was injected.

In this manner, a liquid crystal display with a cell gap of 5.5 μm was manufactured.

In this liquid crystal display, the polyimide molecules in the region brought into contact with the γ-butyrolactone vapor swelled to decrease the orientation degree to $3.729 \times 10^{-3}$. The orientation degree in the region not brought into contact with the γ-butyrolactone vapor was $1.024 \times 10^{-2}$. Accordingly, the ratio of the orientation degrees of the two regions (the orientation degree in the region not brought into contact with the γ-butyrolactone vapor/the orientation degree in the region brought into contact with the γ-butyrolactone vapor) was 2.75. Consequently, the pre-tilt angle of the liquid crystal molecules on the region brought into contact with the γ-butyrolactone vapor was 2°, and the pre-tilt angle of the liquid crystal molecules on the region not brought into contact with the γ-butyrolactone vapor was 5.5°.

In this liquid crystal display, each pixel had two regions whose liquid crystal molecule rise directions upon application of a voltage were different by 180°. These two regions different in the rise direction compensated for the respective view angles. The result was a liquid crystal display with a wide view angle. In effect, the angle of a region with a contrast 5:1 was 60° in the vertical direction, i.e., a liquid crystal display with a very wide view angle was accomplished.

Although tilt disclination occurred in the boundary between these two regions, this tilt disclination was present below signal lines and gate lines. Therefore, the tilt disclination was not seen in a display, resulting in no display problem taking place. In addition, this liquid crystal display showed a good orientation state and was able to provide a high-quality display free of reversal of bright and dark portions caused by a change in the view angle even in a halftone display. Furthermore, since the film properties (the polarity, the charging properties, the dielectric constant, and the thickness) of the region brought into contact with the organic solvent remained almost unchanged, no defective display such as flicker or image sticking occurred.

(Embodiment 9)

In this embodiment, an organic solvent in the gas state was used in the orientation relaxation treatment in Embodiment 4. Therefore, the arrangement of the apparatus is identical with that of Embodiment 4, so this embodiment will be described with reference to FIG. 6.

The manufacturing steps up to the step of rubbing the first and second substrates were done following the same procedure as in Embodiment 1.

A mask was formed on each orientation film subjected to the rubbing orientation treatment by 10 patterning a positive water-soluble resist by a common photolithography process. This mask was so adjusted that each hole of the mask covered a half region of each pixel. That is, the positive water-soluble resist mask was so arranged as to cover only one of regions surrounded by signal lines 51, gate lines 52, and a storage capacity line 54 in each pixel.

Subsequently, as illustrated in FIG. 11, the first or second substrate, 41, having the orientation film, 42, on which the resist mask, 61, was placed was arranged above a beaker 62 containing an organic substance 63, so that the mask 61 opposed the organic substance 63. This was done with the substrate 41 and the beaker 62 placed in a closed vessel 64.

In this embodiment acetone ($\delta=20.3 \times 10^3$ $(J/m^3)^{1/2}$, $\delta d=15.5 \times 10^3$ $(J/m^3)^{1/2}$, $\delta p=10.4 \times 10^3$ $(J/m^3)^{1/2}$, $\delta h=7 \times 10^3$ $(J/m^3)^{1/2}$) was used as the organic substance 63. Note that the distance between the liquid surface of the acetone and the orientation film was 10 mm.

The apparatus was then heated using a heater (not shown) such that the temperatures of the vessel 64 and the acetone were 25° C. Consequently, the vessel 64 was filled up with a saturated vapor of the acetone. The apparatus was left to stand in this state for 25 min. As a result, a region of the orientation film 42 not covered with the mask 61 was brought into contact with the saturated acetone vapor. This region was selectively relaxed in orientation to decrease the pre-tilt angle. The substrate was removed from the vessel after an elapse of 25 min., and nitrogen gas was sprayed onto the entire surface of the substrate to completely volatilize the acetone adhered to the orientation film.

A spacer was spread on the first substrate treated as described above, and a sealing material was coated. Thereafter, the first and second substrates were arranged to oppose each other so that the regions brought into contact with the acetone vapor and the regions not brought into contact with the acetone vapor of the orientation films opposed each other, thereby forming a TN cell with a twist angle of 90°. Into this TN cell a liquid crystal material of Np (twisted counterclockwise) was injected. In this manner, a liquid crystal display with a cell gap of 7.5 μm was manufactured. In this liquid crystal display the liquid crystal molecules had a splay deformation.

In the liquid crystal display, the polyimide molecules in the region brought into contact with the acetone vapor swelled to decrease the orientation degree to $3.682 \times 10^{-3}$. The orientation degree in the region not brought into contact with the acetone vapor was $1.02 \times 10^{-2}$. Accordingly, the ratio of the orientation degrees of the two regions (the orientation degree in the region not brought into contact with the acetone vapor/the orientation degree in the region brought into contact with the acetone vapor) was 2.77. Consequently, the pre-tilt angle of the liquid crystal molecules on the region brought into contact with the acetone vapor was 2.2°, and the pre-tilt angle of the liquid crystal molecules on the region not brought into contact with the acetone vapor was 6°.

In this liquid crystal display, each pixel had two regions whose liquid crystal molecule rise directions upon application of a voltage were different by 180°. These two regions different in the rise direction compensated for the respective view angles. The result was a liquid crystal display with a wide view angle. In effect, the angle of a region with a contrast 5:1 was 50° in the vertical direction, i.e., a liquid crystal display with a very wide view angle was accomplished.

Although tilt disclination occurred in the boundary between these two regions, this tilt disclination was present below the storage capacity lines 54. Therefore, the tilt disclination was not seen in a display, resulting in no display problem taking place. In addition, this liquid crystal display showed a good orientation state and was able to provide a high-quality display free of reversal of bright and dark portions caused by a change in the view angle even in a halftone display. Furthermore, since the film properties (the polarity, the charging properties, the dielectric constant, and the thickness) of the region brought into contact with the organic solvent remained almost unchanged, no defective display such as flicker or image sticking occurred.

(Embodiment 10)

In this embodiment, an organic solvent in the gas state was used in the orientation relaxation treatment in Embodiment 5. Therefore, the arrangement of the apparatus is identical with that of Embodiment 5, so this embodiment will be described with reference to FIGS. 9A, 9B, and 10.

The manufacturing steps up to the step of rubbing the first and second substrates were done following the same procedure as in Embodiment 1.

A 0.5-mm thick titanium mask was placed on each orientation film subjected to the rubbing orientation treatment. The spacing between the orientation film and the mask was set to 5 μm, and the mask was so adjusted that each hole of the mask covered a half region of each pixel. That is, the titanium mask was so arranged as to cover only one of regions surrounded by signal lines 51, gate lines 52, and a storage capacity line 54 in each pixel. This titanium mask was made by forming holes in a titanium plate by irradiating a laser beam.

Subsequently, as illustrated in FIG. 11, the first or second substrate, 41, having the orientation film, 42, on which the titanium mask, 61, was placed was arranged above a beaker 62 containing an organic substance 63, so that the mask 61 opposed the organic substance 63. This was done with the substrate 41 and the beaker 62 placed in a closed vessel 64.

In this embodiment acetone ($\delta=20.3\times10^3$ $(J/m^3)^{1/2}$, $\delta d=15.5\times10^3$ $(J/m^3)^{1/2}$, $\delta p=10.4\times10^3$ $(J/m^3)^{1/2}$, $\delta h=7\times10^3$ $(J/m^3)^{1/2}$) was used as the organic substance 63. Note that the distance between the liquid surface of the acetone and the orientation film was 10 mm.

The apparatus was then heated using a heater (not shown) such that the temperatures of the vessel 64 and the acetone were 40° C. Consequently, the vessel 64 was filled up with a saturated vapor of the acetone. The apparatus was left to stand in this state for 90 min. As a result, a region of the orientation film 42 not covered with the mask 61 was brought into contact with the saturated acetone vapor. This region was selectively relaxed in orientation to decrease the pre-tilt angle. The substrate was removed from the vessel after an elapse of 90 min., and nitrogen gas was sprayed onto the entire surface of the substrate to completely volatilize the acetone adhered to the orientation film.

A spacer was spread on the first substrate treated as described above, and a sealing material was coated. Thereafter, the first and second substrates were made oppose each other to form a TN cell. Into this TN cell a liquid crystal material of Np (twisted counterclockwise) was injected. In this manner, a liquid crystal display with a cell gap of 4.5 μm was manufactured. In this liquid crystal display the liquid crystal molecules had a splay deformation. Consequently, the pre-tilt angle of the liquid crystal molecules on the region brought into contact with the acetone vapor was 1°, and the pre-tilt angle of the liquid crystal molecules on the region not brought into contact with the acetone vapor was 5.5°.

In this liquid crystal display, each pixel had two regions whose liquid crystal molecule rise directions upon application of a voltage were different by 180°. These two regions different in the rise direction compensated for the respective view angles. The result was a liquid crystal display with a wide view angle. Coloration caused by retardation was compensated for by placing a color compensator. In effect, the angle of a region with a contrast 5:1 was 60 ° in the vertical direction, i.e., a liquid crystal display with a very wide view angle was accomplished.

Although tilt disclination occurred in the boundary between these two regions, this tilt disclination was present below the storage capacity lines 54. Therefore, the tilt disclination was not, seen in a display, resulting in no display problem taking place. In addition, this liquid crystal display showed a good orientation state and was able to provide a high-quality display free of reversal of bright and dark portions caused by a change in the view angle even in a halftone display. Furthermore, since the film properties (the polarity, the charging properties, the dielectric constant, and the thickness) of the region brought into contact with the organic solvent remained almost unchanged, no defective display such as flicker or image sticking occurred.

(Embodiment 11)

In this embodiment, an infrared laser was used in the orientation relaxation treatment in Embodiment 1. Therefore, the arrangement of the apparatus is identical with that of Embodiment 1, so this embodiment will be described with reference to FIG. 6.

The manufacturing steps up to the step of rubbing the first and second substrates were done following the same procedure as in Embodiment 1.

A half region of each pixel was irradiated with $1091\text{-cm}^{-1}$ infrared light emitted by oscillating a TEA-$CO_2$ laser using 60-ns wide pulses at intervals of 100 Hz. That is, this infrared light was irradiated only on one of regions surrounded by signal lines 51, gate lines 52, and an auxiliary line 54 in each pixel. Note that the irradiation intensity was 300 mJ/cm$^2$.

Since the spot size of this laser light was as small as 10 μm, the spot size was widened to the size of the half region of each pixel by using a homogenizer. Consequently, it was possible to irradiate the infrared light onto the half region of each pixel without using any mask and to thereby save the time required for mask alignment. In addition, since the $1091\text{-cm}^{-1}$ laser light meeting the vibration mode of the polyimide molecule main chain was irradiated, the polyimide side chain susceptible to thermal influence did not react upon irradiation of this light. As a consequence, the orientation degree of the main chain alone could be selectively decreased.

The first and second substrate treated as described above was washed with an aqueous solution of a nonionic surfactant. A spacer was spread on the resultant first substrate, and a sealing material was coated. Thereafter, the first and second substrates were arranged to oppose each other so that the regions (regions with a high orientation degree) irradiated with the laser and the regions (regions with a low orientation degree) not irradiated with the laser of the orientation films opposed each other, thereby forming a TN cell with a twist angle of 90°. Into this TN cell a liquid crystal material of Np (twisted counterclockwise) was injected in this manner, a liquid crystal display with a cell gap of 6 μm was manufactured.

In this liquid crystal display, the orientation degree of the polyimide molecules in the region irradiated with the laser decreased to $3.718\times10^{-3}$. The orientation degree in the region not irradiated with the laser was $1.024\times10^{-3}$. Accordingly, the ratio of the orientation degrees of the two regions (the orientation degree of the region not irradiated with the laser/the orientation degree of the region irradiated with the laser) was 2.75. Consequently, the pre-tilt angle of the liquid crystal molecules on the region irradiated with the laser was 2°, and the pre-tilt angle of the liquid crystal molecules on the region not irradiated with the laser was 5.5°.

In this liquid crystal display, each pixel had two regions whose liquid crystal molecule rise directions upon application of a voltage were different by 180°. These two regions different in the rise direction compensated for the respective view angles. The result was a liquid crystal display with a wide view angle. In effect, the angle of a region with a contrast 5:1 was 60° in the vertical direction, i.e., a liquid crystal display with a very wide view angle was accomplished.

Although tilt disclination occurred in the boundary between these two regions, this tilt disclination was present below the storage capacity lines 54. Therefore, the tilt disclination was not seen in a display, resulting in no display problem taking place. In addition, this liquid crystal display showed a good orientation state and was able to provide a high-quality display free of reversal of bright and dark portions caused by a change in the view angle even in a halftone display. Furthermore, since the film properties (the polarity, the charging properties, the dielectric constant, and the thickness) of the region subjected to the orientation relaxation treatment by means of infrared laser remained almost unchanged, no defective display such as flicker or image sticking occurred.

(Embodiment 12)

In this embodiment, an infrared laser was used in the orientation relaxation treatment in Embodiment 2. Therefore, the arrangement of the apparatus is identical with that of Embodiment 2, so this embodiment will be described with reference to FIG. 7.

The manufacturing steps up to the step of rubbing the first and second substrates were done following the same procedure as in Embodiment 1.

1721-$cm^{-1}$ infrared light was irradiated (on every other pixel to form a check pattern) as shown in FIG. 7 by oscillating a TEA-$CO_2$ laser using 60-ns wide pulses at intervals of 100 Hz. Note that the irradiation intensity was 200 mJ/$cm^2$.

Since the spot size of this laser light was as small as 10 μm, the spot size was widened to the size of a half region of each pixel by using a homogenizer. This eliminated the need for a mask, so it was possible to save the time required for mask alignment. In addition, since the 1721-$cm^{-1}$ laser light meeting the vibration mode of the polyimide molecule main chain was irradiated, the polyimide side chain susceptible to thermal influence did not react upon irradiation of this light. As a consequence, the orientation degree of the main chain alone could be selectively decreased.

The first and second substrate treated as described above was washed with an aqueous solution of a nonionic surfactant. A spacer was spread on the resultant first substrate, and a sealing material was coated. Thereafter, the first and second substrates were arranged to oppose each other so that the regions (regions with a high orientation degree) irradiated with the laser light and the regions (regions with a low orientation degree) not irradiated with the laser light of the orientation films opposed each other, thereby forming a TN cell with a twist angle of 90°. Into this TN cell a liquid crystal material of Np (twisted counterclockwise) was injected. In this manner, a liquid crystal display with a cell gap of 6 μm was manufactured.

In this liquid crystal display, the orientation degree of the polyimide molecules in the region irradiated with the laser decreased to $3.718 \times 10^{-3}$. The orientation degree in the region not irradiated with the laser was $1.024 \times 10^{-3}$. Accordingly, the ratio of the orientation degrees of the two regions (the orientation degree of the region not irradiated with the laser/the orientation degree of the region irradiated with the laser) was 2.75. Consequently, the pre-tilt angle of the liquid crystal molecules on the region irradiated with the laser was 2°, and the pre-tilt angle of the liquid crystal molecules on the region not irradiated with the laser was 5.5°.

In this liquid crystal display, each pixel had two regions whose liquid crystal molecule rise directions upon application of a voltage were different by 180°. These two regions different in the rise direction compensated for the respective view angles. The result was a liquid crystal display with a wide view angle. In effect, the angle of a region with a contrast 5:1 was 60° in the vertical direction, i.e., a liquid crystal display with a very wide view angle was accomplished.

Although tilt disclination occurred in the boundary between these two regions, this tilt disclination was present below storage capacity lines 54. Therefore, the tilt disclination was not seen in a display, resulting in no display problem taking place. In addition, this liquid crystal display showed a good orientation state and was able to provide a high-quality display free of reversal of bright and dark portions caused by a change in the view angle even in a halftone display. Furthermore, since the film properties (the polarity, the charging properties, the dielectric constant, and the thickness) of the region subjected to the orientation relaxation treatment by means of infrared laser remained almost unchanged, no defective display such as flicker or image sticking occurred.

(Embodiment 13)

In this embodiment, an IR lamp was used in the orientation relaxation treatment in Embodiment 5. Therefore, the arrangement of the apparatus is identical with that of Embodiment 5, so this embodiment will be described with reference to FIGS. 9A, 9B, and 10.

The manufacturing steps up to the step of rubbing the first and second substrates were done following the same procedure as in Embodiment 1.

A 0.1-mm thick stainless-steel mask was placed on an orientation film on the first substrate. The spacing between the orientation film and the mask was set to 10 μm, and the mask was so adjusted that each hole of the mask covered a half region of each pixel. That is, the titanium mask was so arranged as to cover only one of regions surrounded by signal lines 51, gate lines 52, and a storage capacity line 54 in each pixel.

Subsequently, an orientation relaxation treatment was performed by irradiating the orientation film with IR lamp light with an irradiation intensity of 100 mJ/$cm^2$. Note that this IR lamp has the advantage of being able to be purchased by a price about 1/10 the price of an infrared laser.

The first substrate treated as described above was washed with an aqueous solution of a nonionic surfactant. A spacer was spread on the resultant first substrate, and a sealing material was coated. Thereafter, the first and second substrates were made oppose each other to form a TN cell with a twist angle of 90°. Into this TN cell a liquid crystal material of Np (twisted counterclockwise) was injected. In this manner, a liquid crystal display with a cell gap of 6 μm was manufactured.

In this liquid crystal display, the orientation degree of the polyimide molecules in the region irradiated with the IR lamp light decreased to $3.718 \times 10^{-3}$. The orientation degree in the region not irradiated with the IR lamp light was $1.024 \times 10^{-3}$. Accordingly, the ratio of the orientation degrees of the two regions (the orientation degree of the region not irradiated with the IR lamp light/the orientation degree of the region irradiated with the IR lamp light) was 2.75. Consequently, the pre-tilt angle of the liquid crystal molecules on the region irradiated with the IR lamp light was 2°, and the pre-tilt angle of the liquid crystal molecules on the region not irradiated with the IR lamp light was 5.5°. The pre-tilt angle on the orientation film of the second substrate was 3°.

In this liquid crystal display, each pixel had two regions whose liquid crystal molecule rise directions upon application of a voltage were different by 180°. These two regions different in the rise direction compensated for the respective view angles. The result was a liquid crystal display with a wide view angle. Coloration caused by retardation was compensated for by placing a color compensator. In effect, the angle of a region with a contrast 5:1 was 60° in the vertical direction, i.e., a liquid crystal display with a very wide view angle was accomplished.

Although tilt disclination occurred in the boundary between these two regions, this tilt disclination was present below the storage capacity lines 54. Therefore, the tilt disclination was not seen in a display, resulting in no display problem taking place. In addition, this liquid crystal display showed a good orientation state and was able to provide a high-quality display free of reversal of bright and dark portions caused by a change in the view angle even in a halftone display. Furthermore, since the film properties (the polarity, the charging properties, the dielectric constant, and the thickness) of the region subjected to the orientation relaxation treatment by means of IR lamp remained almost unchanged, no defective display such as flicker or image sticking occurred.

In the liquid crystal display of the present invention as has been described above, an orientation film on a substrate is divided into a first region and a second region whose orientation degree is smaller than the orientation degree of the first region, in each pixel, every other pixel, or every few pixels. A pair of substrates are so arranged that the first and second regions oppose each other and the liquid crystal material has a splay deformation. Consequently, two regions different in the rise direction of the liquid crystal molecules on the orientation film are formed in each pixel, every other pixel, or every few pixels. Since these two regions compensate for the respective view angle characteristics, the view angle can be widened.

Also, in the method of manufacturing the liquid crystal display of the present invention, an appropriate orientation relaxation treatment is performed for a portion (e.g., a half region of each pixel) of an orientation film subjected to a rubbing orientation treatment. This changes the pre-tilt angle of the liquid crystal molecules and hence the rise direction of the liquid crystal molecules. Consequently, it is possible by simple manufacturing steps to obtain a liquid crystal display having a wide view angle and free of problems such as flicker and image sticking.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A liquid crystal display manufactured by:
    forming an orientation film on a major surface of each of first and second substrates;
    performing an orientation treatment for said orientation films;
    performing an orientation relaxation treatment for a portion of said orientation film of at least one substrate of said first and second substrates, thereby forming a first region and a second region whose orientation degree is smaller than an orientation degree of said first region;
    arranging said first and second substrates so that said first and second regions of said first substrate and said second and first regions of said second substrate oppose each other, respectively, and that a liquid crystal material has a splay deformation; and
    injecting said liquid crystal material between said first and second substrates thus arranged to oppose each other, wherein the orientation relaxation treatment is done by bringing said orientation films into contact with an organic solvent.

2. A method of manufacturing a liquid crystal display, comprising the steps of:
    forming an orientation film on a major surface of each of first and second substrates;
    performing an orientation treatment for said orientation films;
    performing an orientation relaxation treatment for a portion of said orientation film of each of said first and second substrates, thereby forming a first region and a second region whose orientation degree is smaller than an orientation degree of said first region;
    arranging said first and second substrates so that said first and second regions of said first substrate and said second and first regions of said second substrate oppose each other, respectively, and that a liquid crystal material has a splay deformation; and
    injecting said liquid crystal material between said first and second substrates thus arranged to oppose each other, wherein the orientation relaxation treatment is done by bringing said orientation films into contact with an organic solvent.

3. A method according to claim 2, wherein said organic solvent is in the gas state.

4. A method according to claim 2, wherein a solubility parameter ($\delta$) of said organic solvent satisfies $18.2 \times 10^3$ $(J/m^3)^{1/2} \leq \delta \leq 25.8 \times 10^3$ $(J/m^3)^{1/2}$.

5. A method according to claim 2, wherein the orientation relaxation treatment is done by irradiating infrared light.

6. A method of manufacturing a liquid crystal display, comprising the steps of:
    forming an orientation film on a major surface of a first substrate and performing an orientation treatment for said orientation film;
    forming an orientation film on a major surface of a second substrate and performing an orientation treatment for said orientation film of said second substrate, so that said orientation film has an orientation degree smaller than an orientation degree of an orientation film of said first substrate;
    performing an orientation relaxation treatment for a portion of said orientation film of said first substrate, thereby forming a first region and a second region whose orientation degree is smaller than both of an orientation degree of said first region and the orientation degree of said second substrate;
    arranging said first and second substrates so that a liquid crystal material has a splay deformation; and
    injecting said liquid crystal material between said first and second substrates thus arranged to oppose each other, wherein the orientation relaxation treatment is done by bringing said orientation films into contact with an organic solvent.

7. A method according to claim 6, wherein a three-dimensional solubility parameter of said organic solvent satisfies all of $0.17 \leq \delta d/(\delta d+\delta p+\delta h) \leq 0.60$, $0.16 \leq \delta p/(\delta d+\delta p+\delta h)$, and $\delta h/(\delta d+\delta p+\delta h) \leq 0.43$ (where $\delta d$ is the component due to dispersion forces, $\delta p$ is the component due to polar forces, and $\delta h$ is the component due to hydrogen bond).

8. A method according to claim 6, wherein said organic solvent is in the gas state.

9. A method according to claim 6, wherein a solubility parameter ($\delta$) of said organic solvent satisfies $18.2 \times 10^3$ $(J/m^3)^{1/2} \leq \delta \leq 25.8 \times 10^3$ $(J/m^3)^{1/2}$.

10. A method according to claim 16, wherein a three-dimensional solubility parameter of said organic solvent satisfies all of $0.17 \leq \delta d/(\delta d+\delta p+\delta h) \leq 0.60$, $0.16 \leq \delta p/(\delta d+\delta p+\delta h)$, and $\delta h/(\delta d+\delta p+\delta h) \leq 0.43$ (where $\delta d$ is the component due to dispersion forces, $\delta p$ is the component due to polar forces, and $\delta h$ is the component due to hydrogen bond).

11. A method according to claim 6, wherein the orientation relaxation treatment is done by irradiating infrared light.

* * * * *